United States Patent
Logan et al.

(10) Patent No.: US 10,535,190 B2
(45) Date of Patent: Jan. 14, 2020

(54) SYSTEMS AND METHODS FOR CHANGING A USERS PERSPECTIVE IN VIRTUAL REALITY BASED ON A USER-SELECTED POSITION

(71) Applicant: ROVI Guides, Inc., San Jose, CA (US)

(72) Inventors: Jonathan A. Logan, Mountain View, CA (US); Adam Bates, Los Gatos, CA (US); Hafiza Jameela, Milpitas, CA (US); Jesse F. Patterson, Pacifica, CA (US); Mark K. Berner, Santa Clara, CA (US); Eric Dorsey, Palo Alto, CA (US); David W. Chamberlin, Pacifica, CA (US); Paul Stevens, Felton, CA (US); Herbert A. Waterman, Merced, CA (US)

(73) Assignee: ROVI GUIDES, INC., San Jose, CA (US)

( * ) Notice: Subject to any disclaimer, the term of this patent is extended or adjusted under 35 U.S.C. 154(b) by 14 days.

(21) Appl. No.: 15/856,941

(22) Filed: Dec. 28, 2017

(65) Prior Publication Data
US 2019/0206128 A1    Jul. 4, 2019

(51) Int. Cl.
| G06T 19/00 | (2011.01) |
| G06T 15/20 | (2011.01) |
| G06T 13/40 | (2011.01) |
| H04N 21/218 | (2011.01) |
| H04N 21/81 | (2011.01) |
| G06T 7/73 | (2017.01) |
| H04N 21/472 | (2011.01) |
| H04N 21/4788 | (2011.01) |

(52) U.S. Cl.
CPC .............. *G06T 19/003* (2013.01); *G06T 7/73* (2017.01); *G06T 13/40* (2013.01); *G06T 15/205* (2013.01); *H04N 21/21805* (2013.01); *H04N 21/816* (2013.01); *H04N 21/472* (2013.01); *H04N 21/4788* (2013.01)

(58) Field of Classification Search
None
See application file for complete search history.

(56) References Cited

U.S. PATENT DOCUMENTS

| 6,239,794 B1 | 5/2001 | Yuen |
| 6,564,378 B1 | 5/2003 | Satterfield |
| 7,165,098 B1 | 1/2007 | Boyer |
| 7,230,653 B1 * | 6/2007 | Overton .................. G06T 19/00 348/584 |
| 7,728,868 B2 * | 6/2010 | Razzaque ............ A61B 1/0005 348/77 |
| 7,761,892 B2 | 7/2010 | Ellis |

(Continued)

OTHER PUBLICATIONS

Inamoto et al., Virtual Viewpoint Replay for a Soccer Match by View interpolation from Multiple Cameras, Oct. 2007 (Year: 2007).*

(Continued)

*Primary Examiner* — Hilina K Demeter
(74) *Attorney, Agent, or Firm* — Haley Guiliano LLP

(57) ABSTRACT

Systems and methods are described for a media guidance application (e.g., implemented on a user device) that allows users to select any arbitrary position in a virtual reality environment from where to view the virtual reality content and changes a user's perspective based on the selected position.

18 Claims, 16 Drawing Sheets

(56) References Cited

U.S. PATENT DOCUMENTS

| | | | |
|---|---|---|---|
| 8,046,801 B2 | 10/2011 | Ellis | |
| 8,441,476 B2* | 5/2013 | Gloudemans | G06K 9/346 |
| | | | 345/419 |
| 8,839,306 B2 | 9/2014 | Roberts | |
| 9,137,558 B2 | 9/2015 | Gibbon | |
| 9,406,131 B2* | 8/2016 | Wurmlin | G06T 5/005 |
| 10,080,056 B2 | 9/2018 | Amento | |
| 2002/0158873 A1* | 10/2002 | Williamson | G06T 15/20 |
| | | | 345/427 |
| 2002/0174430 A1 | 11/2002 | Ellis | |
| 2005/0251827 A1 | 11/2005 | Ellis | |
| 2006/0136972 A1* | 6/2006 | Metzger | G08B 13/19689 |
| | | | 725/105 |
| 2007/0291850 A1* | 12/2007 | Ishikawa | H04N 21/21805 |
| | | | 375/240.24 |
| 2010/0153885 A1 | 6/2010 | Yates | |
| 2014/0063061 A1* | 3/2014 | Reitan | G09G 3/003 |
| | | | 345/633 |
| 2014/0228118 A1* | 8/2014 | Hardy | G06T 19/006 |
| | | | 463/31 |
| 2017/0359690 A1* | 12/2017 | Crutchfield | G06F 3/14 |

OTHER PUBLICATIONS

MoreAlia, "New Update*—How to "Raid" +Our First Battle! (Pokemon GO)", p. 1, Jun. 23, 2017 (www.youtube.com/watch?v=KgHpOv).

Morency, et al., "Towards multimodal sentiment analysis : harvesting opinions from the web," Proceedings Of The 13th International Conference On Multimodal Interfaces, ICMI 2011, pp. 169-176 (Nov. 14, 2011).

Ichim et al., "Dynamic 3D Avatar Creation from Hand-Held Video Input," ACM Transactions on Graphics, pp. 1-14 (2015).

Inamato et al., "Virtual Viewpoint Replay for a Soccer Match by View Interpolation From Multiple Cameras," IEEE Transactions on Multimedia, 9(6):1155-1166 (2007).

PCT International Search Report and Written Opinion for International Application No. PCT/US2018/039343 dated Oct. 22, 2018 (30 pages).

* cited by examiner

1600

1602
Begin Process of Superimposing the Depth and Color Information from the First Set of Attributes with the Depth and Color Information from Second Set of Attributes with Respect to the Displacement

1604
Determine a First Origin Point of the Depth and Color Information of the First Set of Attributes

1606
Determine a Second Origin Point of the Depth and Color Information of the Second Set of Attributes

1608
Shift the Second Origin Point by the Displacement to a Third Origin Point

1610
Superimpose the Depth and Color Information of the First Origin Point and the Depth and Color Information of the Third Origin Point

FIG. 16

SYSTEMS AND METHODS FOR CHANGING A USERS PERSPECTIVE IN VIRTUAL REALITY BASED ON A USER-SELECTED POSITION

BACKGROUND

Conventional virtual reality media systems lack the ability to provide users with shared viewing experiences. Typical systems usually feature headset components that isolate users from their physical environment, including their friends, by blocking the view of the users. As a result, users cannot experience media or react to various content alongside peers, ultimately preventing the content from being fully enjoyed. Not to mention, users are usually limited to a select amount of perspectives in a virtual reality environment. Conventional virtual reality media systems select these perspectives based on the placement of virtual reality cameras in a physical environment. For example, the virtual reality camera may be placed in a corner of a football field, during a football game, to generate a virtual reality media asset. Accordingly, the user may be able to view the virtual reality media asset only from the perspective of the camera at the corner of the football field. This severely hinders the user from experiencing the football game from any position on the field or stands.

SUMMARY

Systems and methods are thus described to overcome the limitations of conventional systems by allowing users to select any arbitrary position in a virtual reality environment, and generating a user perspective from the selected position. In addition, systems and methods are described for adding virtual reality versions of a user's friends to a virtual reality media asset. The virtual reality versions may react to the content of a virtual reality media asset based on real captured reactions of the user's friends. Suppose that a user is accessing a virtual reality media asset that features a football game via a Google Daydream headset. The virtual reality media asset may have been generated using two virtual reality cameras symmetrically positioned at opposite sides of the physical football stadium. Using the depth information from both virtual reality cameras, the media guidance application may create a point cloud, and allow the user to select any position on the field to view the football game in virtual reality. A point cloud is a set of coordinates in a three-dimensional coordinate system that represents the external surface of an object. Suppose that the user selects to view the game from the center of the field. The media guidance application may generate a user perspective (e.g., 360-degree view) using the point cloud at the center of the field (e.g., by readjusting the origin point). In addition, the media guidance application may identify an event in the football game (e.g., a touchdown), and retrieve videos of reactions of the user's friends to the event. The media guidance application may generate a virtual avatar of the user's friends with the captured reactions and place them near the user so that he/she can experience the football game alongside friends.

In terms of systems and methods for generating customized shared viewing experiences in virtual reality environments, the media guidance application may receive, via a virtual reality-enabling user device, a first indication that a first user is accessing a virtual reality media asset. The media guidance application may search, via the user device, a database for a first record of a second user that accessed the media asset on second user equipment. The media guidance application may search, via the user device, the database for a recording of a reaction of the second user at a point in the media asset. In response to locating the recording, the media guidance application may generate, via the user device, a video object for insertion into the media asset, at the point, based on the recording. The media guidance application may insert, via the user device, the video object into the media asset and may generate for display, via the user device, the media asset with the video object inserted at the point.

In some aspects, the media guidance application may access, using a virtual reality enabling user device of a user, a virtual reality media asset. The virtual reality enabling device may include devices including, but not limited to, the Oculus Rift, Google Daydream, and PlayStation VR. The virtual reality media asset may be a photo, game, or video that simulates a user's physical presence in a virtual environment. Suppose that the user is accessing a soccer match featuring FC Barcelona and Real Madrid, captured using multiple virtual reality cameras. The user may be viewing the soccer match on his/her smartphone and a virtual reality headset (e.g., Oculus Rift). The media guidance application may generate for display, the virtual reality media asset, and thus allow the user to view the soccer match from a perspective of a virtual reality camera near the soccer field.

The media guidance application may process metadata associated with the virtual reality media asset. The metadata may include information such as the name, description, transmission time, creator names, media type, length, frame details and genre of the virtual reality media asset.

The media guidance application may identify, based on the metadata, a first type of event that occurs at a progression point in the virtual reality media asset. The first type of event may be an event that occurs in the content the user is accessing. In the example given, the first type of event may be a soccer goal made by one of the players. The progression point may be the time, respective to the virtual reality media asset, at which the first type of event takes place (e.g., 5 minutes from the start of the virtual reality media asset).

The media guidance application may determine a plurality of friends associated with the user. The media guidance application may identify the plurality of friends using various sources. For example, the media guidance application may access the user profile associated with the user. The user profile may include a list of friends the user has. The media guidance application may also access a list of friends from social media accounts of the user on the Internet. The media guidance application may also identify friends that the user calls or messages via his/her wireless user communications device (e.g., smartphone). Suppose that the media guidance application identifies friend A and friend B.

The media guidance application may search, based on the first type of event and the plurality of friends associated with the user, a database of videos featuring reactions of the friends to media asset events to identify a video of a friend reacting to an event of the first type while accessing the virtual reality media asset or another media asset. The reactions of users may be captured by any facial expressions capture device that can capture video, audio, or photos, such as a camera or depth-camera (e.g., Microsoft Kinect). The media guidance application may identify the time that a reaction was recorded, the event that took place in the media asset (e.g., soccer goal), and the name of the media asset. This identified information may be stored in a database of videos (also referred to as the media database) as metadata, alongside the reactions. The media database may therefore feature reactions of various users to various events of a virtual reality media asset. The media database may be organized by media assets. For example, a virtual reality media asset of a movie may have a list of events (e.g., different plot points or scenes). For each event, videos of reactions may be stored. Each video may be accompanied by metadata that lists the name of the person who reacted, the event, and the friends associated with the person. Accordingly, the media guidance application may retrieve the videos of reactions to the first type of event by accessing the section of the media database that is associated with the virtual reality media asset, followed by the subsection of the first type of event associated with the virtual reality media asset. The media guidance application may search the metadata for each video to identify the friends of the user.

The media guidance application may generate a video object animating the reaction of the friend to the first type of event, in response to identifying the video of the friend. For example, the media guidance application may identify the video of friend A as he/she is reacting to the same soccer goal, occurring in the same virtual reality media asset that the user is viewing. In some embodiments, the media guidance application may detect additional videos of other friends. For example, the media guidance application may detect a video of friend B reacting to a soccer goal in a video game that friend B was playing. In response, the media guidance application may generate a video object, such as a virtual reality avatar, that animates the reaction of the friend. Animating the reaction of the friend may involve creating a cartoon version of the friend that mimics the friend's facial features by using computer vision to simulate motion capture. Animating the reaction may also include extracting the face of the friend from the video of the reaction and stitching it to the virtual reality avatar.

The media guidance application may insert the video object into the virtual reality media asset at the progression point, in response to identifying the first type of event in the media asset. For example, the progression point may be 5 minutes into the virtual reality media asset playback. In terms of content, the first type of event may occur at the progression point, or moments after. The media guidance application may determine a position in the virtual reality media asset to insert the video object (e.g., virtual avatar of friend). For example, if the user is viewing the virtual reality media asset from the perspective of a first camera, the media guidance application may insert the video object beside the user's position in the virtual reality media asset. Alternatively, the media guidance application may insert the video object near the location where the first type of event occurs. For example, the video object may be placed near the soccer net.

The media guidance application may determine the placement of the video object in the virtual reality media asset by extracting depth information of the virtual reality media asset (e.g., point cloud), using segmentation to identify a floor (e.g., flat surface in the virtual reality media asset), and superimposing depth information associated with the video object with the depth information of the virtual reality media asset. The media guidance application may superimpose the video object depth information at a position in the point cloud of the virtual reality media asset that is a floor (e.g., flat surface) and is closest to the user's perspective position (e.g., position of the virtual reality camera).

The media guidance application may generate, for display, the virtual reality media asset with the video object inserted at the progression point. For example, the media guidance application may generate the soccer match for viewing, and include the virtual avatar with the friend's reaction, at the progression point (e.g., when the first type of event takes place). In some embodiments, the virtual reality-enabling device comprises a hologram projector, further comprising generating for display a hologram of the video object together with the media asset at the progression point. For example, the hologram may project the virtual reality media asset and also include the video object by superimposing depth information as previously mentioned.

In some embodiments, the media guidance application may identify a plurality of videos of a subset of the friends reacting to the first type of event. The media guidance application may retrieve a plurality of attributes for classifying reactions of users. For example, the media guidance application may refer to an emotions database on a remote server. The emotions database may include the reactions of various users to various events. In particular, the database may classify a plurality of attributes such as of changes in a person's face (e.g., eyebrows, eyes, nose, mouth, etc.). For each user, the emotions database may include a basic face (e.g., no emotions). Whenever the person reacts, the media guidance application of the facial expressions capture device (e.g., Microsoft Kinect), may determine the changes in the sections of the person's face from his/her basic face and classify a reaction. For example, widening of the eyes and mouth may be classified as shock. Furthermore, the plurality of attributes may also include audio. For example, a loud scream can be classified as horror, whereas someone saying "Yes!" can be classified as happiness. In order to classify audio, the media guidance application may apply natural language processing (e.g., speech recognition).

The media guidance application may process each of the videos to compare the reaction featured in each video to the plurality of attributes. For example, the media guidance application may extract a video from the media database of a friend's reaction. The media guidance application may divide the face of the user in the video in order to determine the plurality of attributes (e.g., changes in eyes, nose, mouth, etc.). Suppose that the friend is angry about the soccer goal. The media guidance application may compare the plurality of attributes with the friend's basic face in the emotions database. The media guidance application may use computer vision and determine that in comparison to the friend's basic face, the eyebrows in the reaction are angled, the eyes are smaller, and the edges of the mouth are lowered. The media guidance application may classify these changes and refer to a section in the emotions database that lists various emotions, and their plurality of attributes. The media guidance application may determine that angled eyebrows, small eyes, and lowered edges of the mouth are in the anger section of the emotions database. Thus, the friend's reaction is angry.

The media guidance application may then score each of the videos based on a determination of how many attributes are featured in the reaction featured in each video. For example, the media guidance application may identify multiple friends that reacted to an event. Suppose that the media guidance application identifies friend A and friend B. The media guidance application may determine that friend A's eyebrows, eyes, nose, and mouth changed in comparison to friend A's basic face. The media guidance application may also determine that friend B's reaction to the first event is the same as friend B's basic face (e.g., no change in expressions). Furthermore, the media guidance application may score an amount of change from the basic face. For example, the media guidance application may determine a percentage of change in the user's eyes, nose, and mouth based on a difference in pixels of the image of the friend's basic face and reaction. The media guidance application may use vectors to classify how much more angled the friend's eyebrows, eyes, nose, mouth, etc. than the friend's basic face. The score may simply be the amount of change (e.g., percentage, fraction, scale of 1-10, etc.).

The media guidance application may then select as the identified video one of the plurality of videos associated with a highest score. For example, the video of the reaction associated with the highest score represents the greatest amount of deviation from a person's basic face. This signifies that the person had a strong reaction to the event. Accordingly, the media guidance application may select the video of the reaction as the identified video.

In some embodiments, the media guidance application may access a camera of each of the plurality of friends. For example, the camera may be any device that can capture video, audio and images. In this example, the purpose of the camera (also referred to as a facial expression capture device), is to capture reactions of the friends. Accordingly, the media guidance application may refer to the media database and determine the cameras of the plurality of friends associated with the user. Accordingly, the media guidance application of the camera may have access to the metadata of the media assets being consumed by users.

The media guidance application may detect a first event in a first media asset while a first of the plurality of friends is consuming the first media asset. For example, the media guidance application may determine that the plurality of friends is consuming a first media asset (e.g., video, audio, game) by referring to the media database. Since the media guidance application on the cameras uploads reactions of users to the media database, the media guidance application on the user device may recognize a first event that occurs in the first media asset (e.g., a soccer goal in a soccer match virtual reality environment). The media guidance application may detect and classify the first event by utilizing computer vision to detect symbols, objects, and/or words in the first media asset. For example, the media guidance application may classify a point cloud of a soccer ball in a soccer net as a scored goal. The media guidance application may also extract the audio from the first media asset and use natural language processing (e.g., speech recognition) to identify words such as "goal" in the audio.

The media guidance application on the user device may determine the first event is a second type of event. For example, the media guidance application may refer to an event database, which classifies various events, and determine that the first event (e.g., soccer goal) is listed under "scoring a point in a sport." The media guidance application on the camera may capture a first short video of the friend who is consuming the first media asset during the first event. For example, the media guidance application may detect an event in the first media asset and record the reaction of the friend. The media guidance application on the camera may store, in the media database, the first captured short video in association with the second type of event. For example, the media guidance application may upload the video of the reaction of the friend to the media database and store it in the section for the event type "scoring a point in a sport."

In some embodiments, the media guidance application may analyze all reactions of the user's friends and score the reactions to determine the strongest reaction. For example, the media guidance application may compare the faces of the user's friends and determine a numerical deviation (e.g., difference in pixels, distance between edge-detected lines, difference in vectors, etc.) from a basic face of the respective friend (e.g., no reaction). In response to determining the face with the greatest numerical deviation, the media guidance application may display the face in the virtual reality media asset as the "best reaction" and present the face to all friends who access the virtual reality media asset.

In some embodiments, the media guidance application may detect a second event in a second media asset while a second of the plurality of friends is consuming the second media asset. For example, the media guidance application may determine that the plurality of friends is consuming a second media asset (e.g., video, audio, game) by referring to the media database. Since the media guidance application of the cameras uploads reactions of users to the media database, the media guidance application of the user device may recognize a second event that occurs in the second media asset (e.g., player injury in a soccer match virtual reality environment). The media guidance application on the user device may determine the second event is a first type of event. For example, the media guidance application may refer to an event database, which classifies various events, and determine that the second event (e.g., player injury) is listed under "sports injuries." The media guidance application on the camera may capture a second short video of the friend who is consuming the second media asset during the second event. For example, the media guidance application may detect an event in the second media asset and record the reaction of the friend. The media guidance application on the camera may store, in the media database, the second captured short video in association with the first type of event. For example, the media guidance application may upload the video of the reaction of the friend to the media database and store it in the section for the event type "sports injuries."

In some embodiments, the media guidance application may retrieve, based on the first type of event and the plurality of friends associated with the user, from a database of audio tracks featuring reactions of the friends to media asset events, to identify a plurality of audio tracks of a subset of the friends reacting to the first type of event. For example, the media guidance application may identify friends using the media database. Along with retrieving videos of reactions associated with the first type of event, the media guidance application may retrieve audio of reactions associated with the first type of event. For example, the audio may feature cheering because of a soccer goal. The media guidance application may then simultaneously present, to the user, the audio tracks retrieved from the database while the first type of event is occurring at the progression point. For example, the media guidance application may retrieve the audio tracks from the media database and play back the audio at the progression point. It should be noted that the audio may be independent from the video reactions of the friends, or may be the audio portion of the video reaction.

In some embodiments, the media guidance application may store the reaction of a friend in the media database in association with a virtual reality media asset, the play position, and the name of the friend. As a result, when any user of the media guidance application reaches the play position when accessing the virtual reality media asset, the media guidance application may automatically retrieve the reaction(s) and generate the reaction(s) associated with the play position for viewing. In this case, the media guidance application does not rely on determining the type of event to generate the reaction for display.

In some embodiments, the media guidance application may generate a replay of the first type of event. For example, the media guidance application may store the portion of the first media asset that features the first type of event. The media guidance application may then present the stored portion as a replay to the user. The media guidance application may insert the video object during the replay as well. For example, the media guidance application may retrieve the depth information associated with the first media asset and superimpose the depth information associated with the video object (e.g., virtual avatar of the user's friend) onto a section near the user's perceptive position (during the replay).

In some embodiments, the media guidance application may access live video feeds from cameras associated with each of the plurality of friends. For example, cameras of the friends may capture live video feeds of various users and upload them to the media database. The media guidance application on the user's device may refer to the media database and access the live video feeds of the users that identify as the user's friends. As previously mentioned, the media database includes metadata that indicates the names/ usernames of friends associated with the user. The media guidance application may then insert the live video feeds into the background of the virtual reality media asset. For example, the media guidance application may retrieve the live video feeds from the media database and place them in the virtual reality media asset. For example, the live video feeds may be placed as an overlay in the virtual reality environment (e.g., in a certain location of the soccer stadium). The live video feeds may also be fixed to the user's movement. For example, the media guidance application may generate, for display, the live video feeds on the top portion of the screen. Even if the user moves his/her head to view the virtual reality environment, the live video feeds may be locked in position on the user's device display screen and will move, relative to the virtual reality environment, synchronous to the user's head movement.

In some embodiments, the media guidance application may identify a plurality of related media assets scheduled for transmission concurrently with the virtual reality media asset. For example, the media guidance application may retrieve the transmission schedule of various media assets from the Internet. The media guidance application may determine that the user is accessing the virtual reality media asset at 5:00 pm. The media guidance application may then refer to the transmission schedule to determine media assets with similar genres that are taking place on other media sources (e.g., channels, on-demand content, Internet, etc.). Suppose that the media guidance application identifies a media content source that is presenting a virtual reality baseball game. The media guidance application may access the metadata associated with the virtual reality baseball game, and determine that the media asset shares the genre of "sports" with the virtual reality media asset currently being accessed by the user (e.g., soccer match).

In response, the media guidance application may present content from one of the plurality of related media assets during the commercial break. For example, the media guidance application may retrieve a transmission schedule for commercials from the Internet. Based on the transmission schedule, the media guidance application may be able to detect when a commercial break starts and its length. Based on this information, the media guidance application may present the identified media asset (e.g., the baseball game) to the user, during the commercial break. In some embodiments, the media guidance application may use computer vision and speech recognition to determine when a commercial break has started and ended.

In some embodiments, the media guidance application may present supplemental content during the commercial break, wherein the supplemental content includes at least one of previous events featured in the virtual reality media asset (e.g., replays), content associated with a childhood of the user (e.g., old home videos), content representing the user's fantasy sports team competing against another team (e.g., simulations of fantasy sports team players competing with each other). In these cases, the media guidance application may retrieve information such as stored portions of the virtual reality media asset, old videos of the user, and fantasy team information, from the user profile.

In some embodiments, the media guidance application may detect audio commentary associated with the virtual reality media asset in a first voice. For example, using natural language processing, the media guidance application may analyze the frequency and temporal information of audio commentary to identify a voice model associated with a first voice. The media guidance application may identify a commentator in a user profile, the commentator being associated with a second voice. For example, the user's user profile may list commentators that the user prefers listening to. Suppose that the media guidance application retrieves the list and identifies the commentator Martin Tyler in the user profile.

In response, the media guidance application may replace the audio commentary in the first voice with audio commentary in the second voice. For example, the media guidance application may retrieve the voice model of Martin Tyler from a voice database, which provides frequency and temporal information associated with objects, people, animals, etc. The voice database may also include clips of various words or sounds from an object, person or animal. The media guidance application may then retrieve closed-captioning information associated with the virtual reality media asset. Once the media guidance application has textual information about the events in the virtual reality media asset, the media guidance application may generate audio of the second voice (e.g., of Martin Tyler) reading the textual information retrieved from closed-captioning.

In some embodiments, the media guidance application can be used to train pets in response to an event that occurs in the virtual reality media asset. For example, the media guidance application may determine the user's favorite team by referring to the user profile of the user. In response to identifying the user's favorite team, the media guidance application may monitor the virtual reality media asset to determine whether the user's favorite team has scored a point. In response to determining that the user's favorite team has scored (e.g., via image processing, voice recognition, etc.), the media guidance application may retrieve a voice/video clip of the user in which the user is saying "time for treats." The correlation between the user's team scoring and the user's voice "time for treats" may thus be used to train pets that the user has.

In terms of systems and methods for changing a user's perspective in virtual reality, the media guidance application may generate a presentation of a first user perspective at a first camera position in a virtual reality space. The media guidance application may receive a first user request to switch from the first camera position to a user-selected position in the virtual reality space. The media guidance application may generate a second user perspective at the first user-selected position based on a combination of image information received from the first camera position and a second camera position associated with the user-selected position. In response to generating the second user perspective, the media guidance application switches from the first user perspective at the first camera position to the second user perspective at the user-selected position.

In some aspects, the media guidance application may identify a first user perspective at a first camera position in a virtual reality space. Suppose that the user is viewing a soccer match through a Google Daydream headset. In this scenario, the soccer match may be pre-rendered using several virtual reality cameras that can capture 360-degree video. The first camera position represents the location of the first camera in the physical soccer field during recording. Suppose that the first camera is placed along the center of the field at the edge. The first user perspective represents the 360-degree view at the position that the camera captured the 360-degree video. In this case, the term "perspective" may represent the state of the virtual reality environment from the view of a camera. It should be noted that if a camera does not capture a complete 360-degree view, the first user perspective may be limited to the pointing direction of the first camera (e.g., a 110-degree field of view). Furthermore, the first camera position represents an origin point of the point cloud of the first camera position.

The media guidance application may receive a first user request to switch from the first camera position to a first user-selected position in the virtual reality space. The user may utilize a cursor that can be moved in the virtual reality space. Once the user has identified a position of interest, the user may select the position. The media guidance application may receive the user's request to switch to the first user-selected position. For example, the user may select the center circle of the soccer field. Accordingly, the media guidance application may determine the coordinates of the first user-selected position with respect to the origin point of the first camera position. For example, the origin point of the point cloud of the first camera position may be (0,0,0) (e.g., on a x,y,z coordinate system labelled as (x,y,z)). Coordinates may be labelled in physical dimensions (e.g., meters, feet, inches, etc.) or quantitative values on an arbitrary proportional scale. Therefore, (x,y,z) may also represent (width, length, height). Suppose that the media guidance application is using meters for coordinates. The first user-selected position may therefore be (0 meters, 45 meters, 0 meters). This indicates that the first user-selected position is on the same x and z axis, but is 45 meters ahead in the y-axis (e.g., on the center of the field).

The media guidance application may determine a first set of attributes associated with the virtual reality space at the first camera position, wherein the first set of attributes include depth and color information with respect to the first camera position. The media guidance application may retrieve the first set of attributes from the metadata associated with the virtual reality media asset. As discussed previously, the media guidance application may refer to a point cloud to determine physical coordinates of the virtual reality space, along with the objects that inhabit the space. The point cloud may provide depth information, such as coordinates of every point in the point cloud with respect to an origin point. Color information may also be assigned to each coordinate. For example, a point with coordinates (0 meters, 45 meters, 1.8 meters) may represent a point that lies on an object in the virtual reality space. Suppose that the object is a soccer player that is 1.82 meters tall. The point may be a section of the player's face (e.g., skin). If the media guidance application is using RGB values for color information, the color coordinate may be (255, 205, 148) (e.g., brown). Lastly, time information for each coordinate may be an attribute listed. For example, the first set of attributes may be divided in virtual reality frames. In frame 1 (e.g., 30 seconds from the start of the virtual reality media asset), a player may be standing at coordinates (0, 45, 1.8). However, in frame 2 (e.g., 32 seconds from the start of the virtual reality media asset), the player may have moved. Each virtual reality frame may therefore be associated with a time, with the time increments being dependent on the frame refresh rate, as well as depth and color information associated with the frame. The attributes may also incorporate objects that are identified by the media guidance application. For example, the media guidance application may identify the field lines of a stadium, the type of ball, the bench, jersey numbers, names on jerseys, etc. In addition, unique features of the stadium (e.g., team logos, mascots, etc.) may be identified as well. The media guidance application may perform classification and refer to images on the Internet to identify these objects in the virtual environment.

The media guidance application may determine a second set of attributes associated with the virtual reality space at a second camera position, wherein the second set of attributes include depth and color information with respect to the second camera position. Virtual reality content is often captured using multiple virtual reality cameras placed in various locations. For example, a soccer game may be captured with several virtual reality cameras so that the viewer can see the players even if they move to the opposite side of the field. In this case, the media guidance application may identify a second camera position. The media guidance application may refer to the metadata of the virtual reality media asset, which may list the virtual reality camera angles used, and the locations of the virtual reality cameras in the physical environment. For example, the metadata may list that two cameras were used to capture the soccer match. One camera was placed 45 meters to the right of the center of the field, whereas the second camera was placed 45 meters to the left of the center of the field. Upon identifying the second camera position, the media guidance application may determine the second set of attributes associated with the virtual reality space at the second camera position. The second set of attributes may be divided in virtual reality frames. For each frame, the time increment, depth information, and color information may be listed.

The media guidance application may determine a displacement between the first camera position and the second camera position. As mentioned previously, the media guidance application may retrieve information about the number of cameras and their relative positions in the physical environment (e.g., the actual soccer field) from the metadata of the virtual reality media asset. Using the relative positions of the virtual reality cameras, the media guidance application may determine a displacement between the first and second camera position. For example, since one camera is placed 45 meters to the right of the field's center and the second camera is placed 45 meters to the left, the media guidance application may determine that the displacement between the two camera positions is 90 meters along the y-axis.

The media guidance application may generate a third set of attributes associated with the virtual reality space at the first user-selected position, by superimposing the depth and color information from the first set of attributes with the depth and color information from second set of attributes with respect to the displacement. For example, the media guidance application may superimpose the depth and color information from the second set of attributes, with the first set of attributes. It should be noted that the media guidance application may superimpose only to fill in missing information about a virtual reality space. For example, the first camera may be able to capture the front side of a player on the field. However, if the player has his back against the second camera, the second camera will only be able to capture the back-side of the player. Superimposing the depth and color information allows the third set of attributes to include depth and color information that reflects both the front side and back side of the player. The third set of attributes may include a point cloud that provides depth and color information with respect to the origin point of the first camera position. As discussed previously, the media guidance application also holds the coordinates to the first user-selected position. Accordingly, the media guidance application may reconfigure the coordinates in the third set of attributes to refer back to the first user-selected position, rather than the first camera position.

The media guidance application may generate a second user perspective at the first user-selected position based on the third set of attributes. For example, using the third set of attributes, the media guidance application may generate a 360-degree representation of the point cloud. The media guidance application may employ computer vision processes to merge the set of points into a mesh, thus allowing the second user perspective to look like a video, rather than a collection of points.

The media guidance application may switch from the first user perspective at the first camera position to the second user perspective at the first user-selected position. Similar to switching from one camera position to the second camera position, the media guidance application may simply generate, for display, the second user perspective on the user's device.

In some embodiments, the media guidance application may receive a second user request to switch from the first camera position to a first object position in the virtual reality space. The user may use a cursor to navigate the virtual reality space and select a first object position. In response, the media guidance application may retrieve the coordinates of the first object position with respect to the first camera position (e.g., the origin point). The media guidance application may then identify a first object at the first object position. Suppose that the user chooses to view the soccer match through the perspective of Lionel Messi, an athlete in the soccer match. The media guidance application may use the coordinates of the first object position to determine neighboring points in the point cloud. The media guidance application may further use computer vision processes such as clustering and segmentation to determine the shape that the neighboring points create and determine that the first object is a person.

The media guidance application may then generate a fourth set of attributes associated with the virtual reality space at the first object position, by superimposing the depth and color information from the first set of attributes with the depth and color information from second set of attributes with respect to the displacement. The media guidance application may then generate a first object perspective at the first object position based on the fourth set of attributes. The first object perspective remains a 360-degree view of the virtual reality environment, as discussed previously. The first object perspective is produced by converting the point cloud to a mesh, thus allowing the first object perspective to look like a video, rather than a collection of points. In response to generating the first object perspective, the media guidance application may switch from the first user perspective at the first camera position to the first object perspective at the first object position.

In some embodiments, the media guidance application may determine that the first object has changed position to a second object position. For example, the first object, Lionel Messi, may run from one location on the soccer field to another location. The media guidance application may detect the movement of the first object by analyzing a translation of the point cloud cluster of the first object over a course of frames. For example, suppose that the first object is defined by a set of points that are clustered together. If the set of points appears in location A in frame 1, but appears in location B in frame 2, the media guidance application may determine that the first object has changed position to a second object position. In response, the media guidance application may generate a fifth set of attributes associated with the virtual reality space at the second object position, by superimposing the depth and color information from the first set of attributes with the depth and color information from second set of attributes with respect to the displacement.

The media guidance application may then generate a second object perspective at the second object position based on the fifth set of attributes and switch from the first object perspective at the first object position to the second object perspective at the second object position. With these steps, the media guidance application is able to track the object selected by the user throughout the virtual reality media asset, and allow the user to view the virtual reality media asset through the perspective of the object.

In some embodiments, the media guidance application may determine a first origin point of the depth and color information of the first set of attributes and a second origin point of the depth and color information of the second set of attributes. For example, the media guidance application may determine that the first origin point of the first set of attributes is (0,0,0). Similarly, the media guidance application may determine that the second origin point of the second set of attributes is also (0,0,0). The media guidance application may then shift the second origin point by the displacement to a third origin point. As previously mentioned, the media guidance application may refer to the metadata of the virtual reality media asset to determine the number of cameras used to capture the virtual reality media asset and the positions of the cameras. In this case two cameras are used. Accordingly, the media guidance application may determine that the displacement between the two cameras is 90 meters along the y-axis. More specifically, the second camera is 90 meters ahead of the first camera. In response, the media guidance application may shift the second origin point by 90 meters along the y-axis. As a result, all points in the second set of attributes would be shifted by 90 meters as well. The second origin point would be thus identified as a third origin point at (0, 90 meters, 0).

In response, the media guidance application may superimpose the depth and color information of the first origin point and the depth and color information of the third origin point. Once the points have been shifted by 90 degrees, the point cloud of the first set of attributes is placed near the second set of attributes relative to their locations in the physical soccer field.

In some embodiments, the media guidance application may apply a computer vision process to superimpose the depth and color information of the first origin point and the depth and color information of the third origin point. In some instances, the depth information from the first set of attributes may not perfectly meet the depth information from the second set of attributes. In the example given of the front side and back side of a player being superimposed, it is possible that the front-side point cloud has an offset of two centimeters. The small difference may be due to a slight movement of the virtual reality camera that is not recorded in the metadata of the virtual reality media asset. In order to ensure that the points in the point cloud are superimposed correctly, the media guidance application may use registration to superimpose the depth and color information.

In some embodiments, the media guidance application may search a social network of the user to identify a friend associated with the user. The media guidance application may identify the plurality of friends using various sources. For example, the media guidance application may access the user profile associated with the user. The user profile may include a list of friends the user has. The media guidance application may also access a list of friends from social media accounts of the user on the Internet. If the user is using a wireless user communications device, the media guidance application may also identify friends that the user calls or messages. Suppose that the media guidance application identifies friend A.

The media guidance application may then determine whether the friend is within a threshold proximity of a geographical location of the first and second camera positions. For example, friend A may also be viewing the virtual reality media asset of the soccer match. The media guidance application on the user's device may communicate with the media guidance application on the friend's device over a communication network to determine whether the friend is accessing the virtual reality media asset. In response to determining that the friend is accessing the virtual reality media asset, or has previously accessed the virtual reality media asset based on the friend's viewing history, the media guidance application on the user's device may determine that friend A has selected a location in the virtual reality space (e.g., a geographical location) that is within a threshold proximity of the first and second camera positions. If the friend previously accessed the virtual reality media asset, the media guidance application may retrieve a list of selected locations from a perspective database (e.g., in a remote database) that detail the coordinates of the locations that the friend viewed the virtual reality media asset from, and the times/frames at which the friend switched positions.

The media guidance application may then determine whether the friend is/was within the threshold proximity of the geographical location. The threshold proximity may be a boundary or a radius of a specific length (e.g., 45 meters). Suppose that the geographic location of the friend is (0, 15 meters, 0) and the boundary is a sphere with a 45-meter radius from the origin point. The media guidance application may determine that the user's geographic location is within the threshold proximity. In response, the media guidance application may retrieve, from a perspective database, a friend position of the friend. For example, the media guidance application may retrieve the coordinates of the friend (e.g., (12 meters, 30 meters, 1 meter) at a specific frame of the virtual reality media asset (e.g., frame 1) from the perspective database. The perspective database may track the selected locations at each frame of a virtual reality media asset. Furthermore, the perspective database may also contain information about the friends that are associated with each user.

In some embodiments, the media guidance application may generate a hologram of the friend at the friend position in the virtual reality space. For example, the media guidance application may generate a virtual avatar of the friend that resembles the friend.

The media guidance application may execute a resemblance by referring to images of the friend on the friend's social media. The media guidance application may also refer to a media database of the friend that includes recordings of the friend reacting to various events in the virtual reality media asset. The media guidance application may extract the facial features of the friend using computer vision processes (e.g., image recognition, classification, segmentation) to stitch the face of the friend to the virtual avatar. Suppose that the user is accessing the virtual reality media asset using a hologram projector. In this case, the media guidance application may also generate a physical hologram of the friend.

In some embodiments, the media guidance application may enable the user to interact with the friend via the hologram. For example, the media guidance application may allow the user to speak to the hologram or virtual avatar. On the back end of the media guidance application, the media guidance application may send messages to the friend by converting the user's speech to text using speech recognition. If the friend of the user responds, the media guidance application may read the message of the friend to the user through the hologram, in the voice of the friend. Furthermore, the media guidance application may add reactions made by the friend to the hologram, and utilize natural language processing to simulate emotion based on the friend's likes and dislikes.

In some embodiments, the media guidance application may generate a video object animation of the friend. In some embodiments, the video object animation represents a reaction of the friend to an event that takes place at a location associated with the first and second camera positions. For example, the friend may react to an event (e.g., a soccer goal) while viewing the virtual reality media asset at a certain location (e.g., with coordinates (4 meters, 5 meters, 6 meters)). The media guidance application of a camera may be used to capture the reaction of the user. The reaction may be stored in the media database and labelled with the coordinates of the location of the user along with the time/frame information of the virtual reality media asset. Accordingly, the media guidance application may generate a video object animation, such as a virtual reality avatar, that animates the reaction of the friend. The media guidance application may then cause the video object animation to be presented in the form of the hologram. For example, the media guidance application may generate a three-dimensional virtual avatar and project the dimensions of the virtual avatar using a hologram projector.

In some embodiments, the media guidance application may generate point cloud coordinates for a frame of the virtual reality media asset based on coordinates from preceding frames. For example, suppose that the first camera captured information to generate a first camera perspective from one side of the soccer field and the second camera captured information to generate a second camera perspective from the opposite side. It is possible that some parts of the soccer field may not be captured due to objects that appear in front of the camera (e.g., a poster on the boundary around the field may get covered because a player is standing in the way in frame 100). As a result, the media guidance application may refer to the first and second set of attributes and search for coordinates in frames preceding the frame that the user is currently observing. For example, if the media guidance application is generating frame 100 of the virtual reality media asset, the media guidance application may refer to the point cloud coordinates (e.g., depth and color information) of any of the frames between frame 1 and frame 99 (inclusive). The media guidance application may detect that a coordinate (100 meters, 100 meters, 1 meter) exists in a threshold amount of frames, but does not exist in frame 100. The threshold amount of frames may be a number, percentage, or value of frames in which a coordinate exists. Suppose that the coordinate (100 meters, 100 meters, 1 meter) represents a point of a poster on the field's boundary. If the threshold amount of frames is 50, and the coordinate appears in 90 frames, the media guidance application may determine that the coordinate is part of a stationary object, and should be included in frame 100, and possibly all frames after frame 100. If the coordinate does not exist in at least 50 frames, the media guidance application may determine that the object is not stationary (e.g., possibly a point on a player that stood in one position for 30 frames and then changed position). As a result, the media guidance application may not add the coordinate to frame 100.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 16 is a flowchart of a detailed illustrative process for superimposing the depth and color information of the first origin point and the depth and color information of the third origin point, in accordance with some embodiments of the disclosure;

DETAILED DESCRIPTION

Figure 1A:
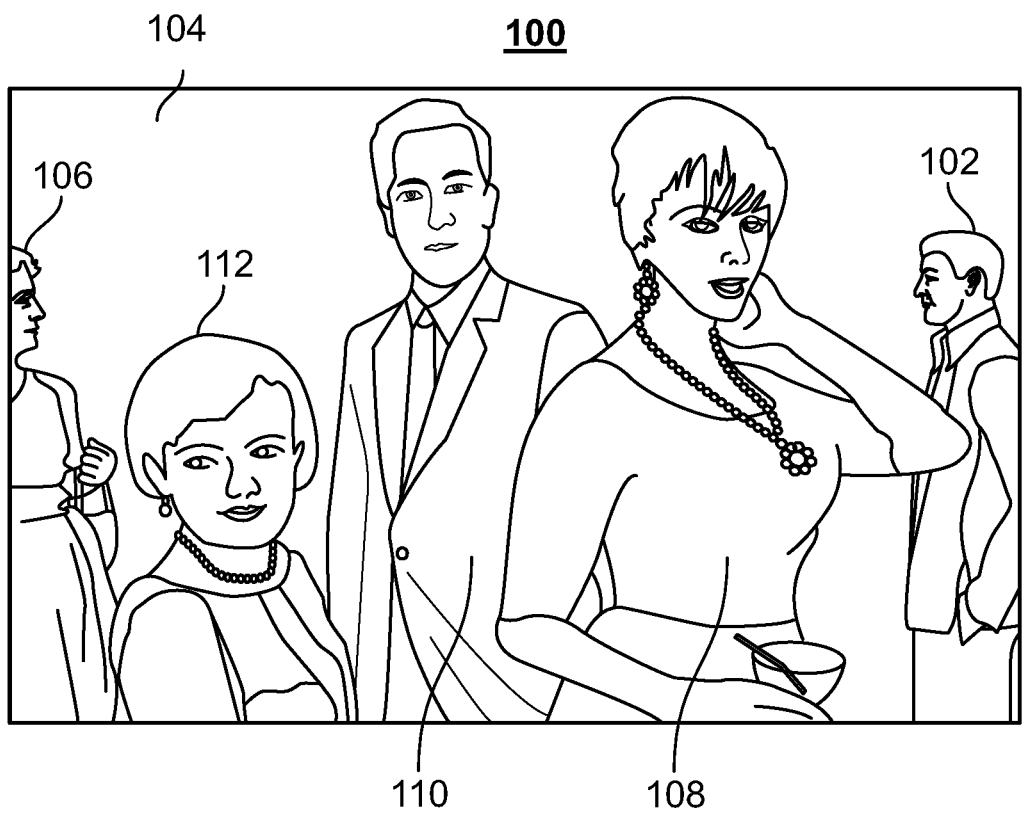
FIGS. 1A and 1B show illustrative examples of display screens for generating customized shared viewing experiences in virtual reality environments, in accordance with some embodiments of the disclosure.

Systems and methods are thus described to overcome the limitations of conventional systems by allowing users to select any arbitrary position in a virtual reality environment, and generating a user perspective from the selected position. In addition, systems and methods are described for adding virtual reality versions of a user's friends to a virtual reality media asset. The virtual reality versions may react to the content of a virtual reality media asset based on real captured reactions of the user's friends. Suppose that a user is accessing a virtual reality media asset that features a football game via a Google Daydream headset. The virtual reality media asset may have been generated using two virtual reality cameras symmetrically positioned at opposite sides of the physical football stadium. Using the depth information from both virtual reality cameras, the media guidance application may create a point cloud and allow the user to select any position on the field to view the football game in virtual reality. Suppose that the user selects to view the game from the center of the field. The media guidance application may generate a user perspective (e.g., 360-degree view) using the point cloud at the center of the field (e.g., by readjusting the origin point). In addition, the media guidance application may identify an event in the football game (e.g., a touchdown), and retrieve videos of reactions of the user's friends to the event. The media guidance application may generate a virtual avatar of the user's friends with the captured reactions and place them near the user so that he/she can experience the football game alongside friends.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Consider a scenario in which a user is viewing the show "Mad Men" in virtual reality using an Oculus Rift device. Suppose that a plurality of the user's friends has already accessed the episode at a previous time. Accordingly, the media guidance application may process metadata associated with the virtual reality media asset such as the name, description, length, frame details and genre of the virtual reality media asset. The media guidance application may identify, based on the metadata, a first type of event that occurs at a progression point in the virtual reality media asset. The first type of event may be a pivotal scene in the show that occurs at a progression point (e.g., 5 minutes from the start of the virtual reality media asset).

Figure 1B:
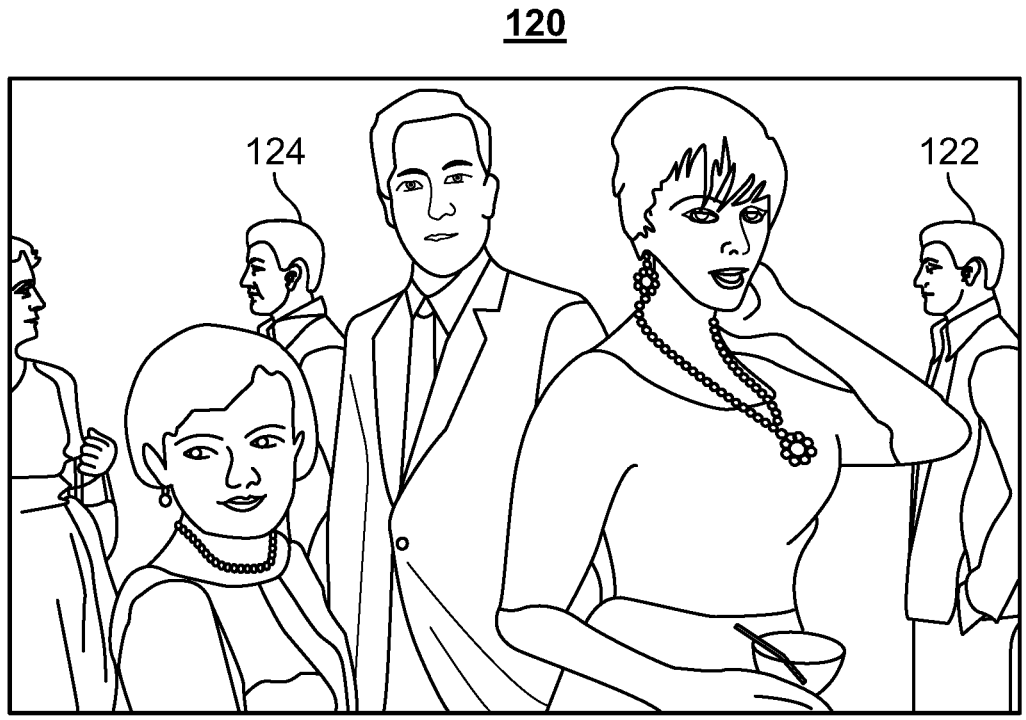

FIGS. 1A and 1B show illustrative examples of display screens 100 and 120, for generating customized shared viewing experiences in virtual reality environments, in accordance with some embodiments of the disclosure. FIG. 1A represents the original virtual reality media asset at the pivotal scene. As can be seen, the virtual reality media asset features five characters in the frame 100. The characters are labelled 102, 106, 108, 110, and 112. It should be noted that each character represents an object in the virtual reality environment. Each object has depth and color information associated with it. The depth information provides quantitative information about the distance of each point in the point cloud, which makes up the object, to an origin point (e.g., the user's perspective position). For example, character 108 is in front of character 110. Character 108 therefore has different depth information that places character 108 closer to the origin point than character 110. Area 104 represents a place where no object exists.

The media guidance application may then determine a plurality of friends associated with the user. The media guidance application may identify the plurality of friends using various sources. For example, the media guidance application may access the user profile associated with the user. The user profile may include a list of friends the user has. The media guidance application may also access a list of friends from social media accounts of the user on the Internet. Suppose that the media guidance application identifies friend A.

The media guidance application may search, based on the first type of event and the plurality of friends associated with the user, a database of videos featuring reactions of the friends to media asset events to identify a video of a friend reacting to the pivotal scene in "Mad Men." The reactions of users may be captured by any facial expressions capture device that can capture video, audio, or photos, such as a camera or depth-camera (e.g., Microsoft Kinect). The database of videos may be located on a remote server that includes reactions of various users to the scene. The media guidance application may specifically retrieve the reactions of the user's friends.

The media guidance application may then generate a video object animating the reaction of the friend to the first type of event, in response to identifying the video of the friend. For example, the media guidance application may identify the video of friend A as he/she is reacting to the same scene in "Mad Men," occurring in the same virtual reality media asset that the user is viewing. Animating the reaction of the friend may involve creating a cartoon version of the friend that mimics the friend's facial features by using computer vision to simulate motion capture. Animating the reaction may also include extracting the image of the face of the friend from the video of the reaction and stitching it to the virtual reality avatar.

The media guidance application may then insert the video object into the virtual reality media asset at the progression point, in response to identifying the first type of event in the media asset. For example, the progression point may be 5 minutes into the virtual reality media asset playback. In terms of content, the first type of event may occur at the progression point, or moments after. The media guidance application may determine a position in the virtual reality media asset to insert the video object (e.g., virtual avatar of friend). For example, if the user is viewing the virtual reality media asset from the perspective of a first camera, the media guidance application may insert the video object beside the user's position in the virtual reality media asset. Alternatively, the media guidance application may insert the video object near the location where the first type of event occurs. For example, the video object may be placed near the main character involved in the scene.

The media guidance application may generate, for display, the virtual reality media asset with the video object inserted at the progression point. For example, the media guidance application may generate the pivotal scene in "Mad Men" for viewing, and include the virtual avatar with the friend's reaction, at the progression point (e.g., when the pivotal scene takes place).

FIG. 1B represents the virtual reality media asset at the pivotal scene along with the user's friends in the background. Character 122 represents an object that previously existed in the pivotal scene, but with the friend's facial features stitched on. In this case, the media guidance application may identify an object that classifies as a person based on a point cloud database. The media guidance application may classify the facial features of the character (e.g., character 102) and replace them with the friend's facial features. Character 124 represents a virtual avatar of the user's friend in area 104. As mentioned previously, area 104 did not have an object. Accordingly, the media guidance application may generate a virtual avatar in area 104 with the facial features of the user. Both characters 122 and 124 may have the reaction of the user's friend, as retrieved from the media database. In some embodiments, in order to blend the virtual avatar, the media guidance application may also replicate the depth information of an object in the virtual reality media asset that is classified as a person. The media guidance application may translate the depth information to area 104 and stitch the friend's face onto the virtual avatar.

Figure 2A:
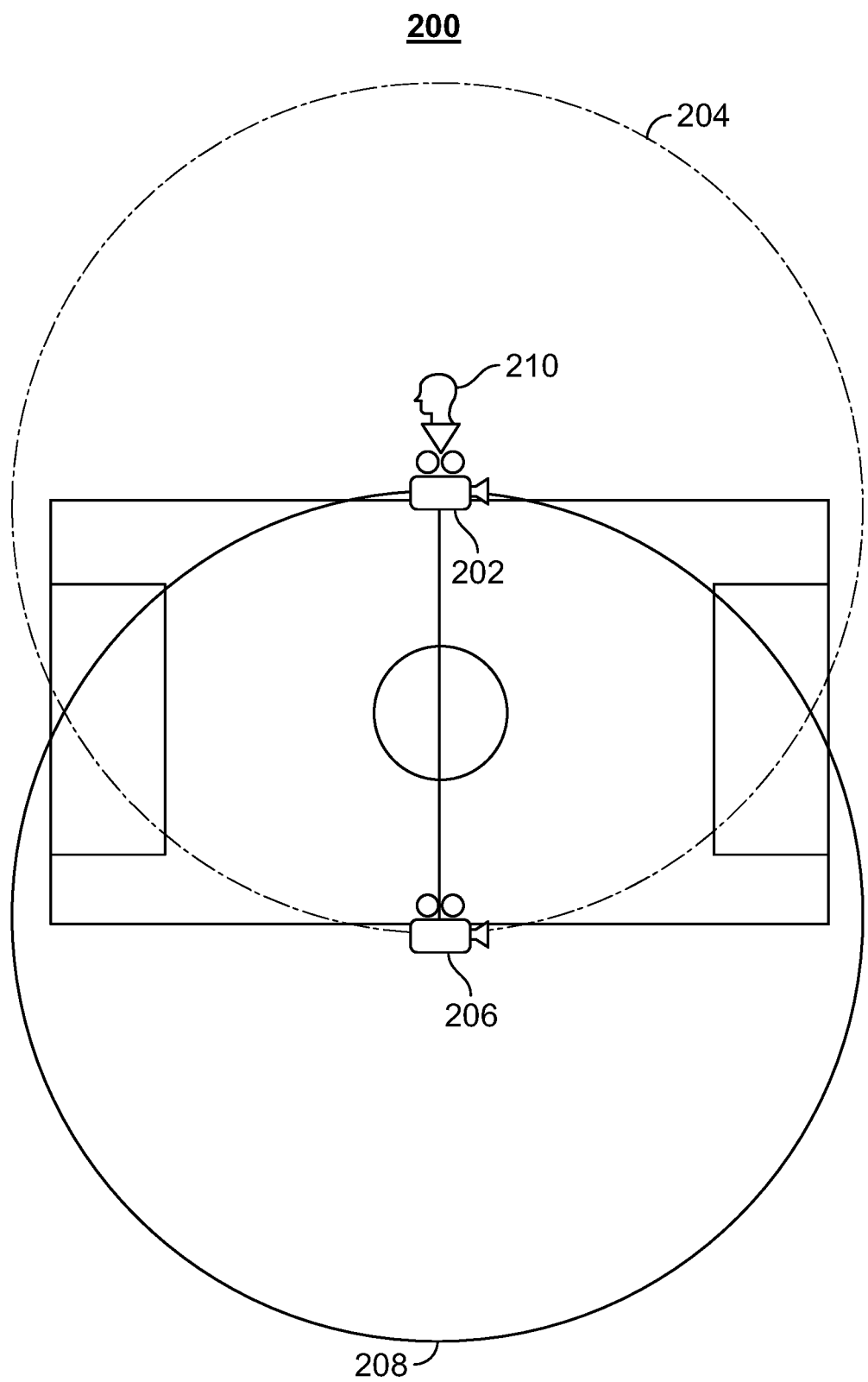
FIGS. 2A and 2B show illustrative examples of display screens for changing a user's perspective in virtual reality, in accordance with some embodiments of the disclosure.
Figure 2B:
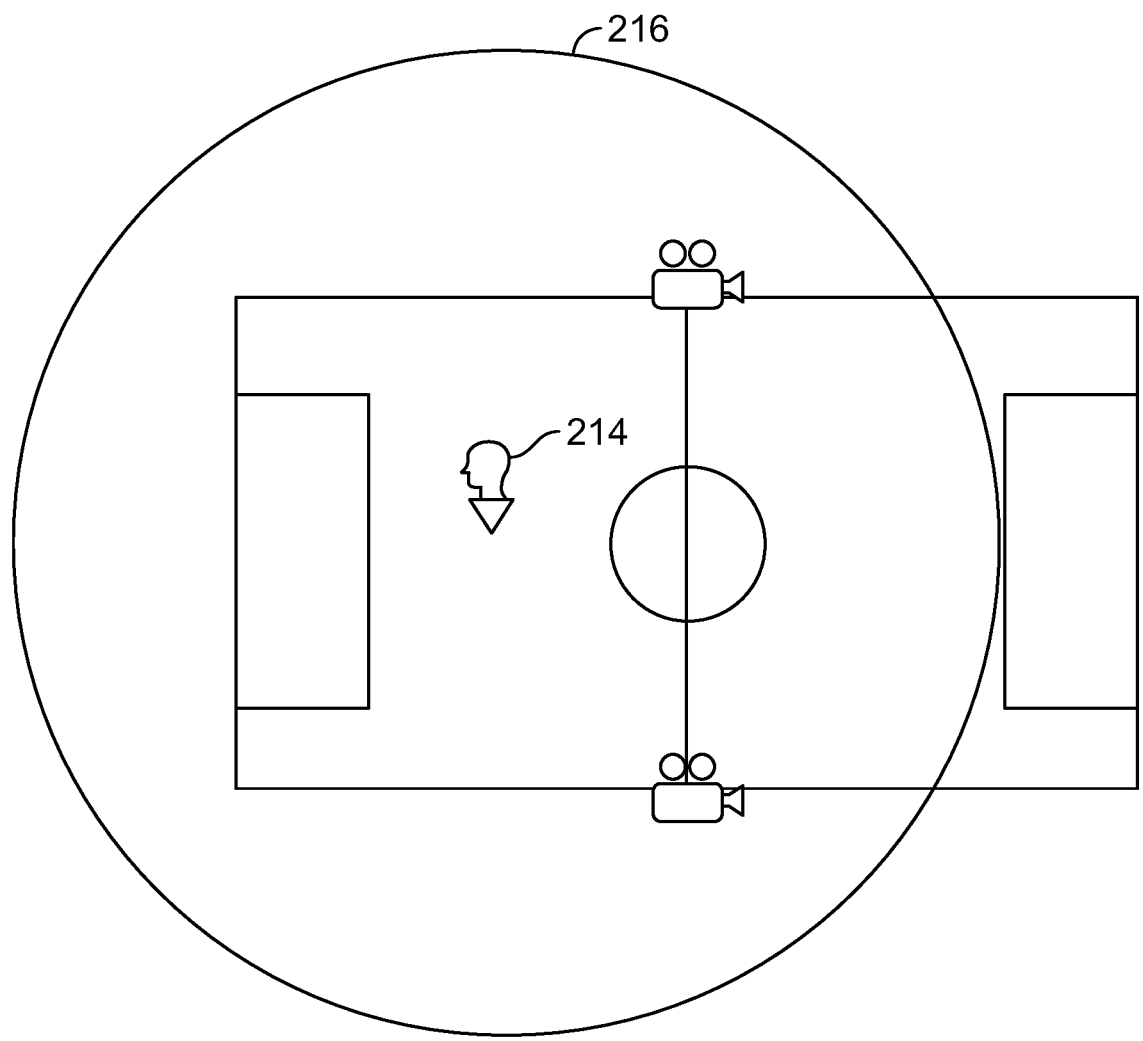

FIGS. 2A and 2B show illustrative examples of display screens 200 and 212 for changing a user's perspective in virtual reality, in accordance with some embodiments of the disclosure. It should be noted that FIG. 2A and FIG. 2B are two-dimensional representations of a three-dimensional virtual reality space. Suppose that the user is viewing a soccer match through a Google Daydream headset. The media guidance application may identify a first user perspective at a first camera position in a virtual reality space. The first camera position represents the location of the first camera in the physical soccer field during recording, as represented in FIG. 2A as camera 202. The first user perspective represents the 360-degree view at the position that the camera captured the 360-degree video, as represented by sphere 204. By default, the first user position is located at the first camera position, as represented by user cursor 210.

The media guidance application may receive a first user request to switch from the first camera position to a first user-selected position in the virtual reality space. The user may utilize a cursor that can be moved in the virtual reality space. This is represented by user cursor 210 in FIG. 2A. Once the user has identified a position of interest, the user may select the position. The media guidance application may receive the user's request to switch to the first user-selected position. For example, the user may select a position in the soccer field, as shown in FIG. 2B as user cursor 214. Accordingly, the media guidance application may determine the coordinates of the first user-selected position with respect to the origin point of the first camera position. For example, the origin point of the point cloud of the first camera position may be (0,0,0) (e.g., on a x,y,z coordinate system labelled as (x,y,z)). Suppose that the media guidance application is using meters for coordinates. The first user-selected position may therefore be (15 meters, 45 meters, 0 meters). This indicates that the first user-selected position is on the same z-axis, but is 45 meters ahead in the y-axis and 15 meters to the left in the x-axis.

The media guidance application may determine a first set of attributes associated with the virtual reality space at the first camera position, wherein the first set of attributes include depth and color information with respect to the first camera position. The media guidance application may retrieve the first set of attributes from the metadata associated with the virtual reality media asset. As discussed previously, the media guidance application may refer to a point cloud to determine physical coordinates of the virtual reality space, along with the objects that inhabit the space. The point cloud may provide depth information, such as coordinates of every point in the point cloud with respect to an origin point. Color information may also be assigned to each coordinate. For example, a point with coordinates (0 meters, 45 meters, 1.8 meters) may represent a point that lies on an object in the virtual reality space. Suppose that the object is a soccer player that is 1.82 meters tall. The point may be a section of the player's face (e.g., skin). If the media guidance application is using RGB values for color information, the color coordinate may be (255, 205, 148) (e.g., brown). Lastly, time information for each coordinate may be an attribute listed. For example, the first set of attributes may be divided in virtual reality frames. In frame 1 (e.g., 30 seconds from the start of the virtual reality media asset), a player may be standing at coordinates (0, 45, 1.8). However, in frame 2 (e.g., 32 seconds from the start of the virtual reality media asset), the player may have moved. Each virtual reality frame may therefore be associated with a time, with the time increments being dependent on the frame refresh rate, as well as depth and color information associated with the frame.

The media guidance application may determine a second set of attributes associated with the virtual reality space at a second camera position, wherein the second set of attributes include depth and color information with respect to the second camera position. Virtual reality content is often captured using multiple virtual reality cameras placed in various locations. For example, a soccer game may be captured with several virtual reality cameras so that the viewer can see the players even if they move to the opposite side of the field. In this case, the media guidance application may identify a second camera position. The second camera position is represented in FIG. 2A as camera 206. The second camera perspective, from which the second set of attributes is derived is represented by sphere 208. Upon identifying the second camera position, the media guidance application may determine the second set of attributes associated with the virtual reality space at the second camera position. The second set of attributes may be divided in virtual reality frames. For each frame, the time increment, depth information, and color information may be listed.

The media guidance application may then determine a displacement between the first camera position (e.g., camera 202) and the second camera position (e.g., camera 206). The media guidance application may retrieve information about the number of cameras and their relative positions in the physical environment (e.g., the actual soccer field) from the metadata of the virtual reality media asset. Using the relative positions of the virtual reality cameras, the media guidance application may determine a displacement between the first and second camera position. For example, since one camera is placed 45 meters to the right of the field's center and the second camera is placed 45 meters to the left, the media guidance application may determine that the displacement between the two camera positions is 90 meters along the y-axis.

The media guidance application may then generate a third set of attributes associated with the virtual reality space at the first user-selected position, by superimposing the depth and color information from the first set of attributes with the depth and color information from second set of attributes with respect to the displacement. For example, the media guidance application may superimpose the depth and color information from the second set of attributes, with the first set of attributes. Superimposing the depth and color information may simply involve merging the list of all of the point cloud coordinates in the first set of attributes with the list of point cloud coordinates in the second set of attributes.

The media guidance application may then generate a second user perspective at the first user-selected position based on the third set of attributes. For example, using the third set of attributes, the media guidance application may generate a 360-degree representation of the point cloud, as represented by sphere 216 in FIG. 2B. The media guidance application may employ computer vision processes to merge the set of points into a mesh, thus allowing the second user perspective to look like a video, rather than a collection of points.

The media guidance application may switch from the first user perspective at the first camera position (e.g., user cursor 210) to the second user perspective at the first user-selected position (e.g., user cursor 214). Similar to switching from one camera position to the second camera position, the media guidance application may simply generate, for display, the second user perspective on the user's device.

Figure 3:
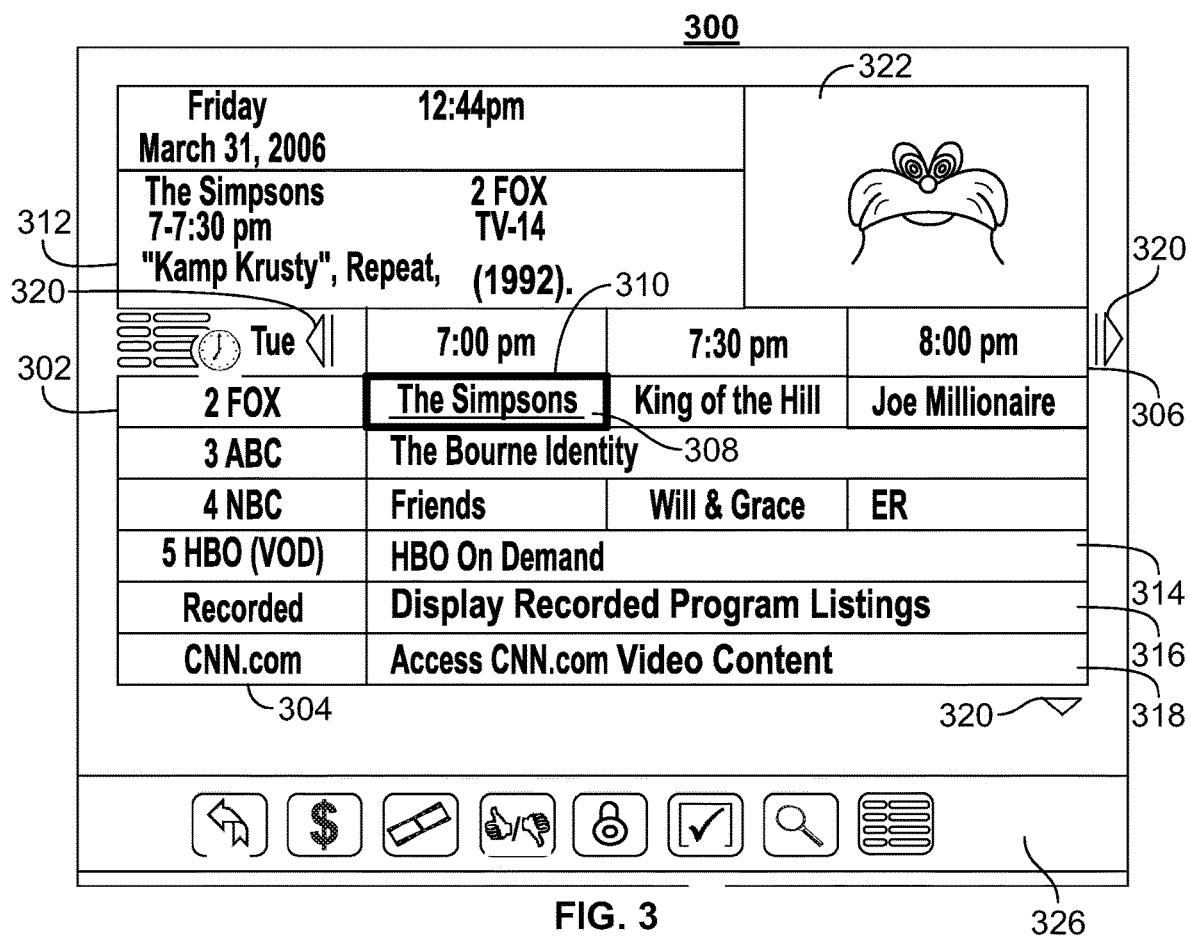
FIGS. 3 and 4 show illustrative examples of display screens generated by a media guidance application in accordance with some embodiments of the disclosure.
Figure 4:
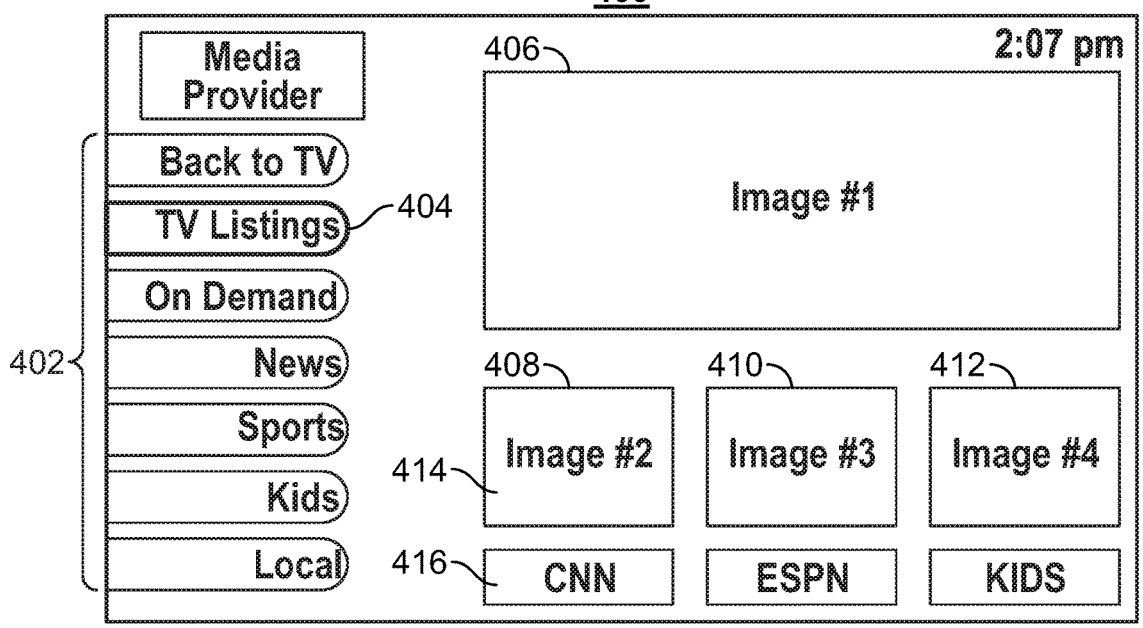

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
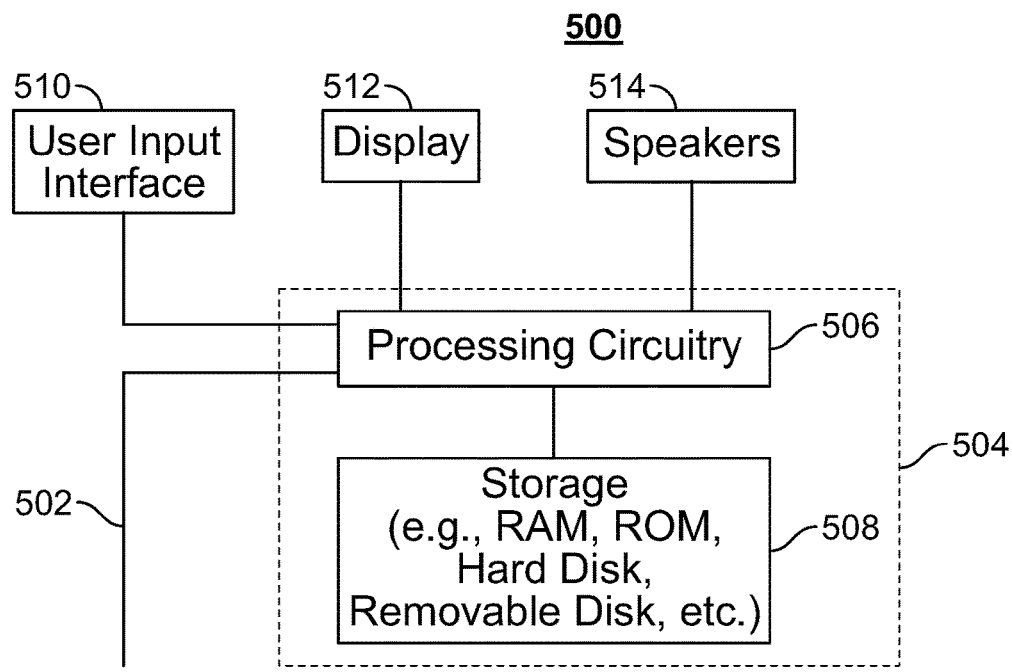
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
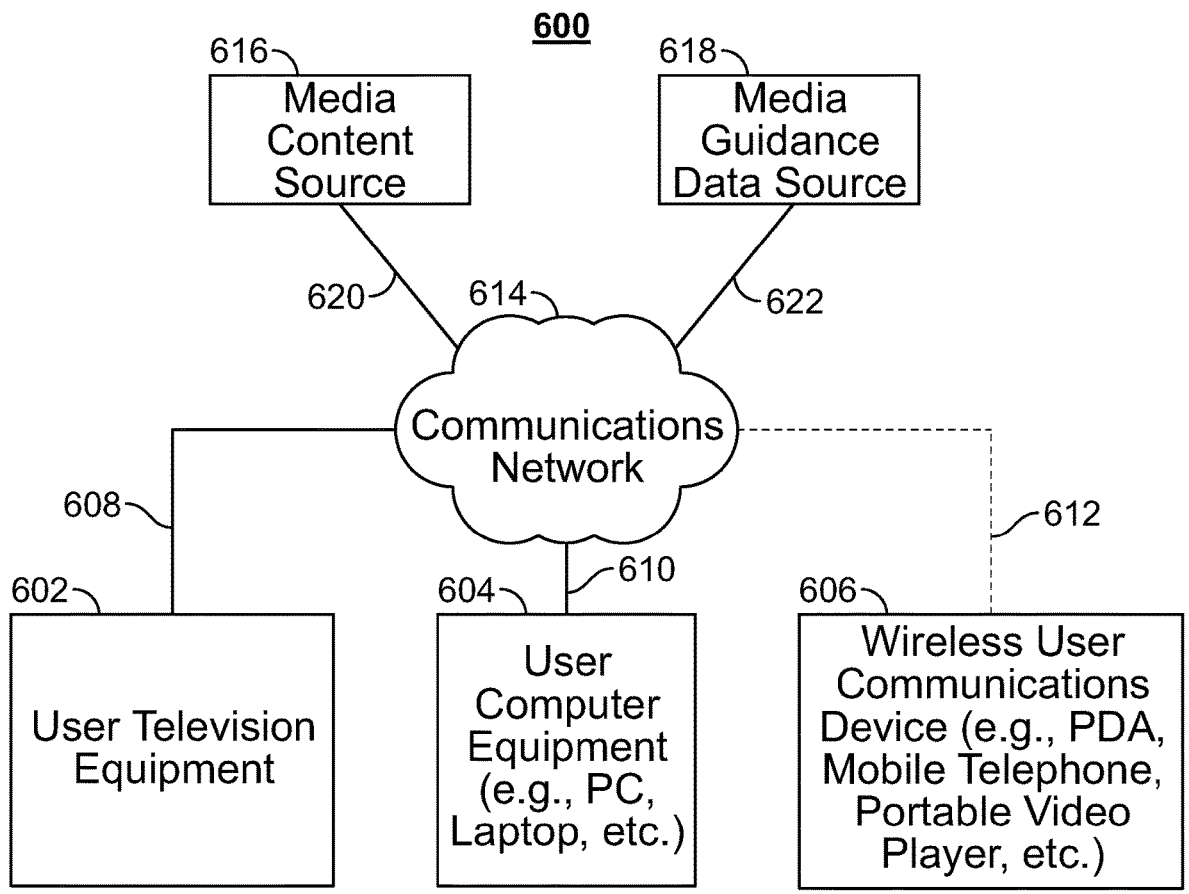
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
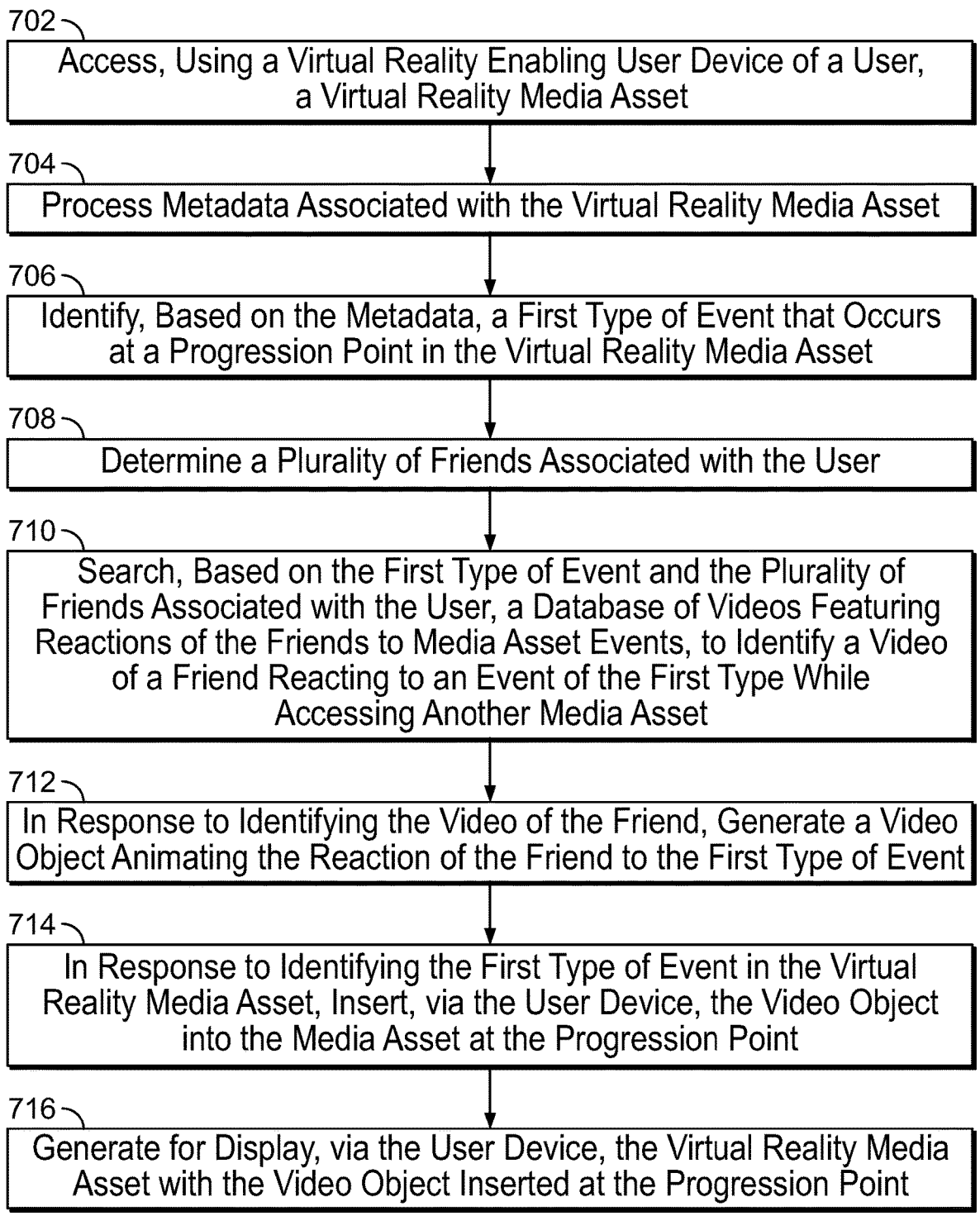
FIG. 7 is a flowchart of a detailed illustrative process for generating a video object animating the reaction of a friend of the user, in accordance with some embodiments of the disclosure.

FIG. 7 is a flowchart of a detailed illustrative process for generating a video object animating the reaction of a friend of the user, in accordance with some embodiments of the disclosure. It should be noted that process 700 or any step thereof could be performed on, or provided by, any of the devices shown in FIGS. 5-6. For example, process 700 may be executed by control circuitry 504 (FIG. 5) as instructed by a media guidance application implemented on a user device (e.g., user equipment devices 602, 604, and/or 606 (FIG. 6)) in order to generate a video object animating the reaction of a friend of the user. In addition, one or more steps of process 700 may be incorporated into or combined with one or more steps of any other process or embodiment (e.g., as described in relation to FIGS. 1A, 1B, 2A, 2B and 8-18).

At step 702, control circuitry 504 (FIG. 5) accesses, using a virtual reality enabling user device of a user, a virtual reality media asset. The virtual reality enabling device user device may be user television equipment 602, user computer equipment 604, or wireless user communications device 606 (FIG. 6). Specific examples of virtual reality enabling devices include the Oculus Rift, Google Daydream, and PlayStation VR. The virtual reality media asset may be a photo, game, or video that simulates a user's physical presence in a virtual environment. The virtual reality media asset may be accessed from media content source 616. Suppose that the user is accessing a soccer match featuring FC Barcelona and Real Madrid, captured using multiple virtual reality cameras. The user may be viewing the soccer match on his/her smartphone and a virtual reality headset (e.g., oculus rift). Control circuitry 504 may generate for display, the virtual reality media asset, and thus allow the user to view the soccer match from a perspective of a virtual reality camera near the soccer field. Seeing as the media asset is a virtual reality media asset, the user is fully immersed in the virtual reality environment, and can view the soccer match in a 360-degree motion (e.g., tilt head in any direction to view the analogous real-life visual).

At step 704, control circuitry 504 (FIG. 5) processes metadata associated with the virtual reality media asset. For example, control circuitry 504 may access media guidance data source 618 (FIG. 6). The metadata may include information such as the name, description, transmission time, creator names, media type, length, frame details and genre of the virtual reality media asset.

At step 706, control circuitry 504 (FIG. 5) identifies, based on the metadata, a first type of event that occurs at a progression point in the virtual reality media asset. The first type of event may be an event which occurs in the content the user is accessing. In the example given, the first type of event may be a soccer goal made by one of the players. The progression point may be the time, respective to the virtual reality media asset, at which the first type of event takes place (e.g., 5 minutes from the start of the virtual reality media asset).

At step 708, control circuitry 504 (FIG. 5) determines a plurality of friends associated with the user. Control circuitry 504 may identify the plurality of friends using various sources. For example, control circuitry 504 may access the user profile in storage 508 associated with the user. The user profile may include a list of friends the user has. Control circuitry 504 may also access a list of friends from social media accounts of the user on the Internet. If the user is using wireless user communications device 606 (FIG. 6), control circuitry 504 may also identify friends that the user calls or messages via wireless user communications device 606. Suppose that control circuitry 504 identifies friend A and friend B.

At step 710, control circuitry 504 (FIG. 5) searches, based on the first type of event and the plurality of friends associated with the user, a database of videos featuring reactions of the friends to media asset events to identify a video of a friend reacting to an event of the first type while accessing the virtual reality media asset or another media asset. The reactions of users may be captured by any facial expressions capture device that can capture video, audio, or photos, such as a camera or depth-camera (e.g., Microsoft Kinect). Control circuitry 504 may identify the time that a reaction was recorded, the event that took place in the media asset (e.g., soccer goal), and the name of the media asset. This identified information may be stored in a database of videos (also referred to as the media database) as metadata, alongside the reactions. The media database may therefore feature reactions of various users to various events of a virtual reality media asset. The media database may be organized by media assets. For example, a virtual reality media asset of a movie may have a list of events (e.g., different plot points or scenes). For each event, videos of reactions may be stored. Each video may be accompanied by metadata that lists the name of the person who reacted, the event, and the friends associated with the person. Accordingly, control circuitry 504 may retrieve the videos of reactions to the first type of event by accessing the section of the media database that is associated with the virtual reality media asset, followed by the subsection of the first type of event associated with the virtual reality media asset. Control circuitry 504 may search the metadata for each video to identify the friends of the user. In some cases, the media database may include reactions of users to other media assets (e.g., videos, audio, games, etc.). The reactions may be to events similar to the first type of event. For example, the first type of event may be a soccer goal in a virtual reality media asset featuring a soccer match between FC Barcelona and Real Madrid. The reactions of the friends may also be to a soccer goal event, but from a different media asset (e.g., videos, audio, games) and may feature different teams.

At step 712, control circuitry 504 (FIG. 5) generates a video object animating the reaction of the friend to the first type of event, in response to identifying the video of the friend. For example, control circuitry 504 may identify the video of friend A as he/she is reacting to the same soccer goal, occurring in the same virtual reality media asset that the user is viewing. In some embodiments, control circuitry 504 may detect additional videos of other friends. For example, control circuitry 504 may detect a video of friend B reacting to a soccer goal in a video game that friend B was playing. In response, control circuitry 504 may generate a video object, such as a virtual reality avatar, that animates the reaction of the friend. Animating the reaction of the friend may involve creating a cartoon version of the friend that mimics the friend's facial features by using computer vision to simulate motion capture. Animating the reaction may also include extracting the face of the friend from the video of the reaction and stitching it to the virtual reality avatar.

At step 714, control circuitry 504 inserts the video object into the virtual reality media asset at the progression point, in response to identifying the first type of event in the media asset. For example, the progression point may be 5 minutes into the virtual reality media asset playback. In terms of content, the first type of event may occur at the progression point, or moments after. Control circuitry 504 may determine a position in the virtual reality media asset to insert the video object (e.g., virtual avatar of friend). For example, if the user is viewing the virtual reality media asset from the perspective of a first camera, control circuitry 504 may insert the video object beside the user's position in the virtual reality media asset. Alternatively, control circuitry 504 may insert the video object near the location where the first type of event occurs. For example, the video object may be placed near the soccer net.

Control circuitry 504 may determine the placement of the video object in the virtual reality media asset by extracting depth information of the virtual reality media asset (e.g., point cloud), using segmentation to identify a floor (e.g., flat surface in the virtual reality media asset), and superimposing depth information associated with the video object with the depth information of the virtual reality media asset. Control circuitry 504 may superimpose the video object depth information at a position in the point cloud of the virtual reality media asset that is a floor (e.g., flat surface) and is closest to the user's perspective position (e.g., position of the virtual reality camera). Control circuitry 504 may also classify sections of the point cloud to identify different objects in the virtual reality media asset. For example, using depth information in the point cloud of a soccer net, control circuitry 504 may refer to a point cloud database that includes depth information about various objects and provides a classification for each object. Control circuitry 504 may compare the depth information from the virtual reality media asset with the depth information in the point cloud database to label objects in the virtual reality media asset. In this example, the depth information of the soccer net may match an entry in the point cloud database listed as "soccer net" with comparable depth information. Control circuitry 504 may further use a depth threshold to determine a level of similarity between the depth informations. For example, soccer nets can vary in shape and size. Control circuitry 504 may determine that the depth information in the point cloud database and in the virtual reality media asset match by 90% (e.g., 90% of the points have the same depth value). If the depth threshold is 80%, control circuitry 504 may determine that the depth information match is greater than the depth threshold, and classify the object in the virtual reality media asset as a soccer net. Upon classifying the object, control circuitry 504 may superimpose the depth information of the video object near the classified object. For example, control circuitry 504 may classify a person in the stands during the soccer match. In response, control circuitry 504 may place the video object of the virtual avatar beside the classified object (e.g., the person in the stands).

At step 716, control circuitry 504 (FIG. 5) generates, for display, the virtual reality media asset with the video object inserted at the progression point. For example, control circuitry 504 may generate the soccer match for viewing on display 512, and include the virtual avatar with the friend's reaction, at the progression point (e.g., when the first type of event takes place). In some embodiments, the virtual reality enabling device comprises a hologram projector, further comprising generating for display a hologram of the video object together with the media asset at the progression point.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 7.

Figure 8:
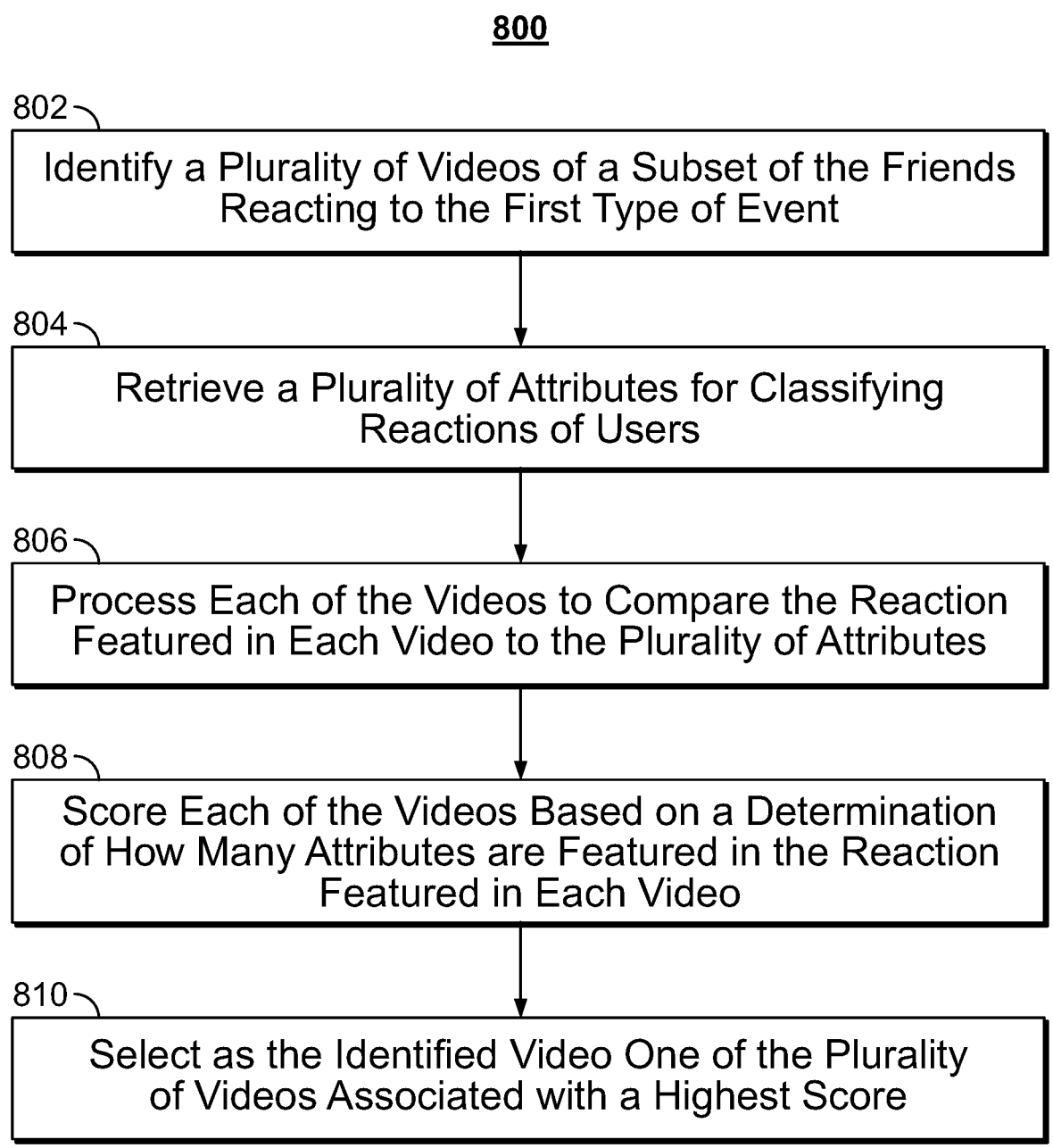
FIG. 8 is a flowchart of a detailed illustrative process for scoring videos based on a determination of how many attributes are featured in the reaction featured in a video, in accordance with some embodiments of the disclosure.

FIG. 8 is a flowchart of a detailed illustrative process for scoring videos based on a determination of how many attributes are featured in the reaction featured in a video, in accordance with some embodiments of the disclosure. It should be noted that process 800 or any step thereof could be performed on, or provided by, any of the devices shown in FIGS. 5-6. For example, process 800 may be executed by control circuitry 504 (FIG. 5) as instructed by a media guidance application implemented on a user device (e.g., user equipment devices 602, 604, and/or 606 (FIG. 6)) in order to score videos based on a determination of how many attributes are featured in the reaction featured in a video. In addition, one or more steps of process 800 may be incorporated into or combined with one or more steps of any other process or embodiment (e.g., as described in relation to FIGS. 1A, 1B, 2A, 2B, 7 and 9-18).

At step 802, control circuitry 504 (FIG. 5) identifies a plurality of videos of a subset of the friends reacting to the first type of event. This process is discussed in step 708 and 710 of FIG. 7.

At step 804, control circuitry 504 (FIG. 5) retrieves a plurality of attributes for classifying reactions of users. For example, control circuitry 504 may refer to an emotions database on a remote server. The emotions database may include the reactions of various users to various events. In particular, the database may classify a plurality of attributes of changes in a person's face (e.g., eyebrows, eyes, nose, mouth, etc.). For each user, the emotions database may include a basic face (e.g., no emotions). Whenever the person reacts, control circuitry 504 of the facial expressions capture device (e.g., Microsoft Kinect), may determine the changes in the sections of the person's face from his/her basic face and classify a reaction. For example, widening of the eyes and mouth may be classified as shock. Furthermore, the plurality of attributes may also include audio. For example, a loud scream can be classified as horror, whereas someone saying "Yes!" can be classified as happiness. In order to classify audio, control circuitry 504 may apply natural language processing (e.g., speech recognition).

At step 806, control circuitry 504 (FIG. 5) processes each of the videos to compare the reaction featured in each video to the plurality of attributes. For example, control circuitry 504 may extract a video from the media database of a friend's reaction. Control circuitry 504 may divide the face of the user in the video in order to determine the plurality of attributes (e.g., changes in eyes, nose, mouth, etc.). Suppose that the friend is angry about the soccer goal. Control circuitry 504 may compare the plurality of attributes with the friend's basic face in the emotions database. Control circuitry 504 may use computer vision and determine that in comparison to the friend's basic face, the eyebrows in the reaction are angled, the eyes are smaller, and the edges of the mouth are lowered. Control circuitry 504 may classify these changes and refer to a section in the emotions database that lists various emotions, and their plurality of attributes. Control circuitry 504 may determine that angled eyebrows, small eyes, and lower edges of the mouth are in the anger section of the emotions database. Thus, the friend's reaction is angry.

At step 808, control circuitry 504 (FIG. 5) scores each of the videos based on a determination of how many attributes are featured in the reaction featured in each video. For example, control circuitry 504 may identify multiple friends that reacted to an event. Suppose that control circuitry 504 identifies friend A and friend B. Control circuitry 504 may determine that friend A's eyebrows, eyes, nose, and mouth changed in comparison to friend A's basic face. Control circuitry 504 may also determine that friend B's reaction to the first event is the same as friend B's basic face (e.g., no change in expressions). Furthermore, control circuitry 504 may score an amount of change from the basic face. For example, control circuitry 504 may determine a percentage of change in the user's eyes, nose, and mouth based on a difference in pixels of the image of the friend's basic face and reaction. Control circuitry 504 may use vectors to classify how much more angled the friend's eyebrows, eyes, nose, mouth, etc. than the friend's basic face. The score may simply be the amount of change (e.g., percentage, fraction, scale of 1-10, etc.).

At step 810, control circuitry 504 (FIG. 5) selects as the identified video one of the plurality of videos associated with a highest score. For example, the video of the reaction associated with the highest score represents the greatest amount of deviation from a person's basic face. This signifies that the person had a strong reaction to the event. Accordingly, control circuitry 504 may select the video of the reaction as the identified video.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 8.

Figure 9:
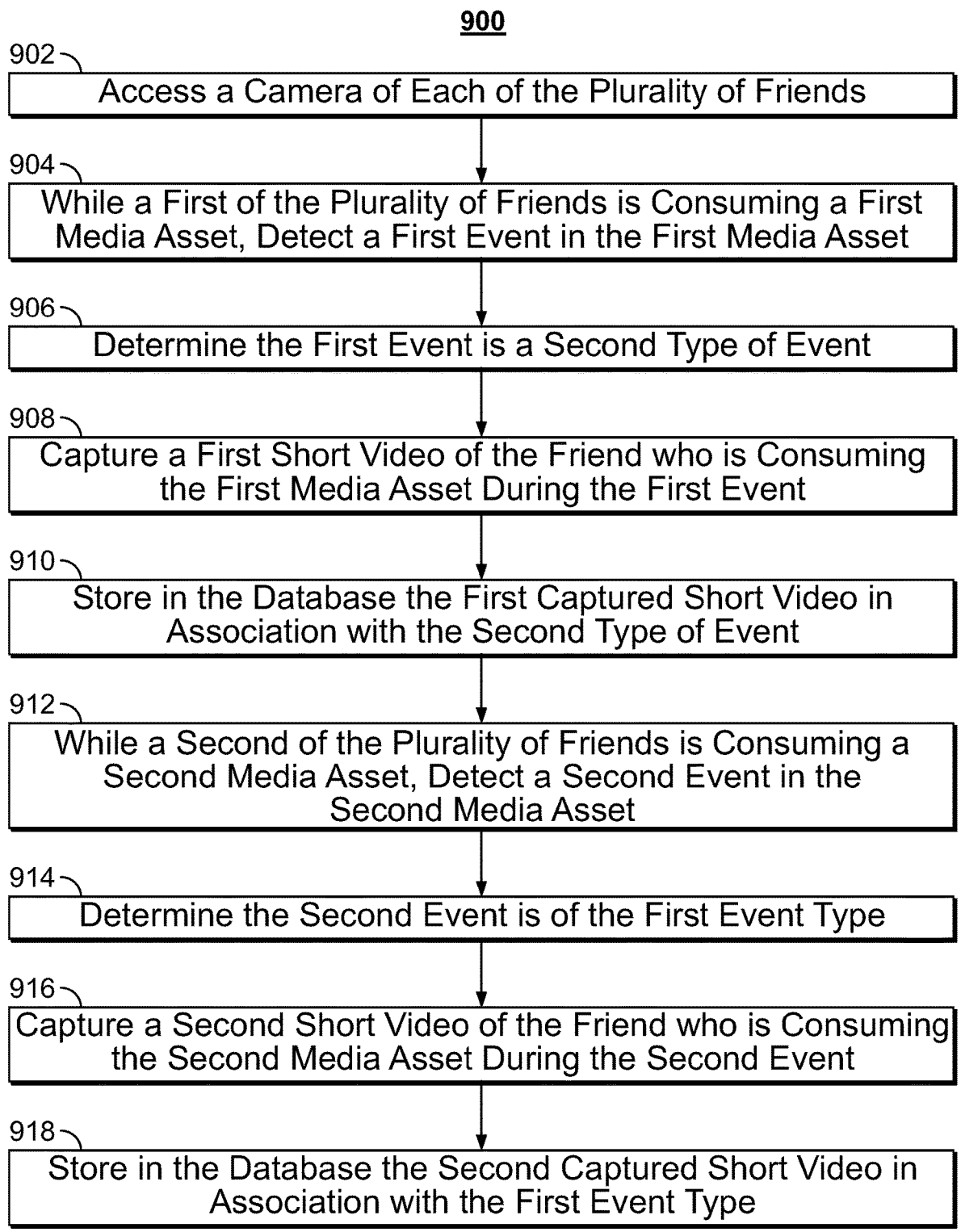
FIG. 9 is a flowchart of a detailed illustrative process for capturing short videos of friends who are consuming media assets, in accordance with some embodiments of the disclosure.

FIG. 9 is a flowchart of a detailed illustrative process for capturing short videos of friends who are consuming media assets, in accordance with some embodiments of the disclosure. It should be noted that process 900 or any step thereof could be performed on, or provided by, any of the devices shown in FIGS. 5-6. For example, process 900 may be executed by control circuitry 504 (FIG. 5) as instructed by a media guidance application implemented on a user device (e.g., user equipment devices 602, 604, and/or 606 (FIG. 6)) in order to capture short videos of friends who are consuming media assets. In addition, one or more steps of process 900 may be incorporated into or combined with one or more steps of any other process or embodiment (e.g., as described in relation to FIGS. 1A, 1B, 2A, 2B, 7-8 and 10-18).

At step 902, control circuitry 504 (FIG. 5) accesses a camera of each of the plurality of friends. For example, the camera may be any device that can capture video, audio and images. In this example, the purpose of the camera (also referred to as facial expression capture device), is to capture reactions of the friends. Accordingly, control circuitry 504 may refer to the media database and determine the cameras of the plurality of friends associated with the user. The cameras may be associated with the media content source 616 (FIG. 6). Accordingly, control circuitry 504 of the camera may have access to the metadata of the media assets being consumed by users.

At step 904, control circuitry 504 (FIG. 5) detects a first event in a first media asset while a first of the plurality of friends is consuming the first media asset. For example, control circuitry 504 may determine that the plurality of friends is consuming a first media asset (e.g., video, audio, game) by referring to the media database. Since control circuitry 504 of the cameras uploads reactions of users to the media database, control circuitry 504 of the user device may recognize a first event that occurs in the first media asset (e.g., a soccer goal in a soccer match virtual reality environment). Control circuitry 504 may detect and classify the first event by utilizing computer vision to detect symbols, objects, and/or words in first media asset. For example, control circuitry 504 may classify a point cloud of a soccer ball in a soccer net as a scored goal. Control circuitry 504 may also extract the audio from the first media asset and using natural language processing (e.g., speech recognition) to identify words such as "goal" in the audio.

At step 906, control circuitry 504 (FIG. 5) of the user device determines the first event is a second type of event. For example, control circuitry 504 may refer to an event database, which classifies various events, and determine that the first event (e.g., soccer goal) is listed under "scoring a point in a sport."

At step 908, control circuitry 504 (FIG. 5) of the camera captures a first short video of the friend who is consuming the first media asset during the first event. For example, control circuitry 504 may detect an event in the first media asset and record the reaction of the friend.

At step 910, control circuitry 504 (FIG. 5) of the camera stores, in the media database, the first captured short video in association with the second type of event. For example, control circuitry 504 may upload the video of the reaction of the friend to the media database and store it in the section for the event type "scoring a point in a sport."

At step 912, control circuitry 504 (FIG. 5) detects a second event in a second media asset while a second of the plurality of friends is consuming the second media asset. For example, control circuitry 504 may determine that the plurality of friends is consuming a second media asset (e.g., video, audio, game) by referring to the media database. Since control circuitry 504 of the cameras uploads reactions of users to the media database, control circuitry 504 of the user device may recognize a second event that occurs in the second media asset (e.g., player injury in a soccer match virtual reality environment).

At step 914, control circuitry 504 (FIG. 5) of the user device determines the second event is a first type of event. For example, control circuitry 504 may refer to an event database, which classifies various events, and determine that the second event (e.g., player injury) is listed under "sports injuries."

At step 916, control circuitry 504 (FIG. 5) of the camera captures a second short video of the friend who is consuming the second media asset during the second event. For example, control circuitry 504 may detect an event in the second media asset and record the reaction of the friend.

At step 918, control circuitry 504 (FIG. 5) of the camera stores, in the media database, the second captured short video in association with the first type of event. For example, control circuitry 504 may upload the video of the reaction of the friend to the media database and store it in the section for the event type "sports injuries."

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 9.

Figure 10:
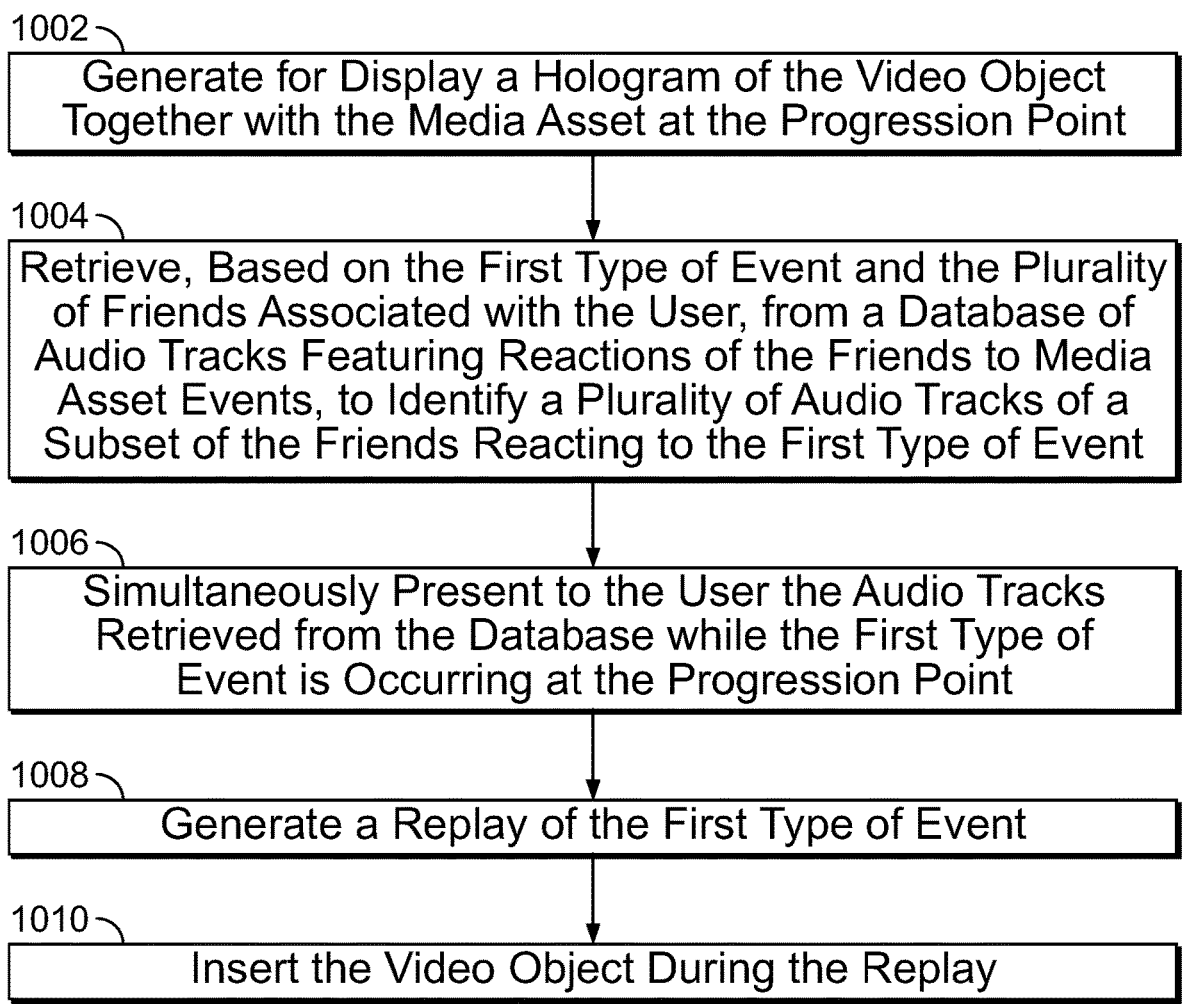
FIG. 10 is a flowchart of a detailed illustrative process for generating a replay of the first type of event with the video object and audio tracks, in accordance with some embodiments of the disclosure.

FIG. 10 is a flowchart of a detailed illustrative process for generating a replay of the first type of event with the video object and audio tracks, in accordance with some embodiments of the disclosure. It should be noted that process 1000 or any step thereof could be performed on, or provided by, any of the devices shown in FIGS. 5-6. For example, process 1000 may be executed by control circuitry 504 (FIG. 5) as instructed by a media guidance application implemented on a user device (e.g., user equipment devices 602, 604, and/or 606 (FIG. 6)) in order to generate a replay of the first type of event with the video object and audio tracks. In addition, one or more steps of process 1000 may be incorporated into or combined with one or more steps of any other process or embodiment (e.g., as described in relation to FIGS. 1A, 1B, 2A, 2B, 7-9 and 11-18).

At step 1002, control circuitry 504 (FIG. 5) generates, for display, a hologram of the video object together with the media asset at the progression point. For example, control circuitry 504 may generate a hologram of a virtual avatar of the friend of the user. This step may happen after step 716 of FIG. 7. The hologram may be generated by a hologram projector.

At step 1004, control circuitry 504 (FIG. 5) retrieves, based on the first type of event and the plurality of friends associated with the user, from a database of audio tracks featuring reactions of the friends to media asset events, to identify a plurality of audio tracks of a subset of the friends reacting to the first type of event. For example, control circuitry 504 may identify friends using the media database. Along with retrieving videos of reactions associated with the first type of event, control circuitry 504 may retrieve audio of reactions associated with the first type of event. For example, the audio may feature cheering because of a soccer goal.

At step 1006, control circuitry 504 (FIG. 5) simultaneously presents to the user the audio tracks retrieved from the database while the first type of event is occurring at the progression point. For example, control circuitry 504 may retrieve the audio tracks from the media database and playback the audio at the progression point. It should be noted that the audio may be independent from the video reactions of the friends, or may be the audio portion of the video reaction.

At step 1008, control circuitry 504 (FIG. 5) generates a replay of the first type of event. For example, control circuitry 504 may store the portion of the first media asset that features the first type of event in storage 508. Control circuitry 504 may then present the stored portion as a replay to the user.

At step 1010, control circuitry 504 (FIG. 5) inserts the video object during the replay. For example, control circuitry 504 may retrieve the depth information associated with the first media asset and superimpose the depth information associated with the video object (e.g., virtual avatar of the user's friend) onto a section near the user's perceptive position (during the replay).

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 10.

Figure 11:
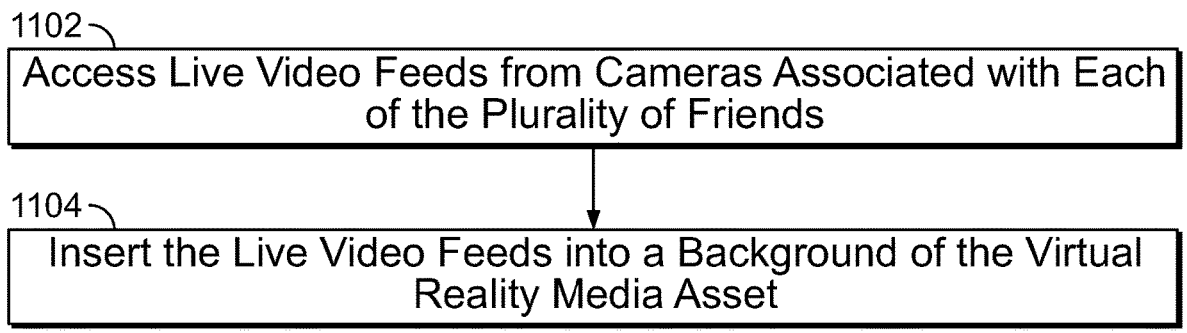
FIG. 11 is a flowchart of a detailed illustrative process for inserting live video feeds into a background of the media asset, in accordance with some embodiments of the disclosure.

FIG. 11 is a flowchart of a detailed illustrative process for inserting live video feeds into a background of the media asset, in accordance with some embodiments of the disclosure. It should be noted that process 1100 or any step thereof could be performed on, or provided by, any of the devices shown in FIGS. 5-6. For example, process 1100 may be executed by control circuitry 504 (FIG. 5) as instructed by a media guidance application implemented on a user device (e.g., user equipment devices 602, 604, and/or 606 (FIG. 6)) in order to insert live video feeds into a background of the media asset. In addition, one or more steps of process 1100 may be incorporated into or combined with one or more steps of any other process or embodiment (e.g., as described in relation to FIGS. 1A, 1B, 2A, 2B, 7-10 and 12-18).

At step 1102, control circuitry 504 (FIG. 5) accesses live video feeds from cameras associated with each of the plurality of friends. For example, cameras of the friends discussed in step 902, may capture live video feeds of various users. These live feeds may be uploaded to the media database. Control circuitry 504 on the user's device may refer to the media database and access the live video feeds of the users which identify as the user's friends. As previously mentioned, the media database includes metadata that indicates the names/usernames of friends associated with the user.

At step 1104, control circuitry 504 (FIG. 5) inserts the live video feeds into a background of the virtual reality media asset. For example, control circuitry 504 may retrieve the live video feeds from the media database and place them in the virtual reality media asset. For example, the live video feeds may be placed as an overlay in the virtual reality environment (e.g., in a certain location of the soccer stadium). The live video feeds may also be fixed to the user's movement. For example, control circuitry 504 may generate, for display, the live video feeds on the top portion of the screen. Even if the user moves his/her head to view the virtual reality environment, the live video feeds may be locked in position on the user's device display screen and will move, relative to the virtual reality environment, synchronous to the user's head movement.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 11.

Figure 12:
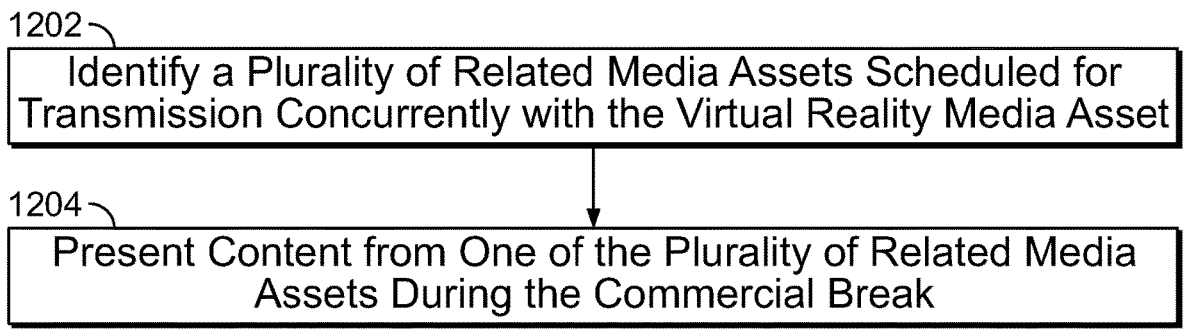
FIG. 12 is a flowchart of a detailed illustrative process for presenting content from one of the plurality of related media assets during a commercial break, in accordance with some embodiments of the disclosure.

FIG. 12 is a flowchart of a detailed illustrative process for presenting content from one of the plurality of related media assets during a commercial break, in accordance with some embodiments of the disclosure. It should be noted that process 1200 or any step thereof could be performed on, or provided by, any of the devices shown in FIGS. 5-6. For example, process 1200 may be executed by control circuitry 504 (FIG. 5) as instructed by a media guidance application implemented on a user device (e.g., user equipment devices 602, 604, and/or 606 (FIG. 6)) in order to present content from one of the plurality of related media assets during a commercial break. In addition, one or more steps of process 1200 may be incorporated into or combined with one or more steps of any other process or embodiment (e.g., as described in relation to FIGS. 1A, 1B, 2A, 2B, 7-11 and 13-18).

At step 1202, control circuitry 504 (FIG. 5) identifies a plurality of related media assets scheduled for transmission concurrently with the virtual reality media asset. For example, control circuitry 504 may retrieve the transmission schedule of various media assets from the media guidance data source 618 (FIG. 6). Control circuitry 504 may determine that the user is accessing the virtual reality media asset at 5:00 pm. Control circuitry 504 may then refer to the transmission schedule to determine media assets with similar genres which are taking place on other media sources (e.g., channels, on-demand content, Internet, etc.). Suppose that control circuitry 504 identifies a media content source that is presenting a virtual reality baseball game. Control circuitry 504 may access the metadata associated with the virtual reality baseball game, and determine that the media asset shares the genre of "sports" with the virtual reality media asset currently being accessed by the user (e.g. soccer match).

At step 1204, control circuitry 504 (FIG. 5) presents content from one of the plurality of related media assets during the commercial break. For example, control circuitry 504 may retrieve a transmission schedule for commercials from the media guidance data source 618 (FIG. 6). Based on the transmission schedule, control circuitry 504 may be able to detect when a commercial break starts and its length. Based on this information, control circuitry 504 may present the identified media asset in step 1202 (e.g., the baseball game) to the user, during the commercial break. In some embodiments, control circuitry 504 may use computer vision and speech recognition to determine when a commercial break has started and ended. For example, control circuitry 504 may monitor for portions of the virtual reality media asset that indicate that a commercial is set to start. Certain cues that a commercial is set to begin include a drastic change in color on the screen (e.g., change from a green football stadium to a white screen and a gray car), changes in audio (e.g., narrator changes), and speech such as "we will be right back after the commercials." In some embodiments, control circuitry 504 may present supplemental content during the commercial break, wherein the supplemental content includes at least one of previous events featured in the virtual reality media asset (e.g., replays), content associated with a childhood of the user (e.g., old home videos), content representing the user's fantasy sports team competing against another team (e.g., simulations of fantasy sports team players competing with each other). In these cases, control circuitry 504 may retrieve information such as stored portions of the virtual reality media asset, old videos of the user, and fantasy team information from, respectively, from the user profile in storage 508.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 12.

Figure 13:
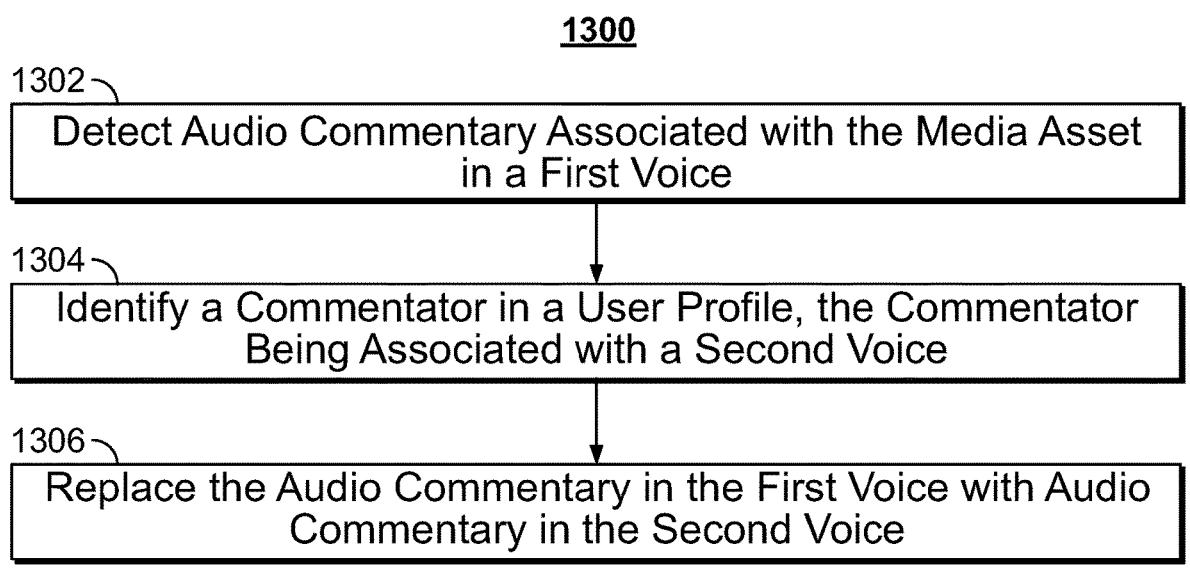
FIG. 13 is a flowchart of a detailed illustrative process for replacing the audio commentary in a first voice with audio commentary in a second voice, in accordance with some embodiments of the disclosure.

FIG. 13 is a flowchart of a detailed illustrative process for replacing the audio commentary in a first voice with audio commentary in a second voice, in accordance with some embodiments of the disclosure. It should be noted that process 1300 or any step thereof could be performed on, or provided by, any of the devices shown in FIGS. 5-6. For example, process 1300 may be executed by control circuitry 504 (FIG. 5) as instructed by a media guidance application implemented on a user device (e.g., user equipment devices 602, 604, and/or 606 (FIG. 6)) in order to replace the audio commentary in a first voice with audio commentary in a second voice. In addition, one or more steps of process 1300 may be incorporated into or combined with one or more steps of any other process or embodiment (e.g., as described in relation to FIGS. 1A, 1B, 2A, 2B, 7-12 and 14-18).

At step 1302, control circuitry 504 (FIG. 5) detects audio commentary associated with the virtual reality media asset in a first voice. For example, using natural language processing, control circuitry 504 may analyze the frequency and temporal information of audio commentary to identify a voice model associated with a first voice.

At step 1304, control circuitry 504 (FIG. 5) identifies a commentator in a user profile, the commentator being associated with a second voice. For example, the user's user profile may list commentators that the user prefers listening to. Suppose that control circuitry 504 retrieves the list and identifies the commentator, Martin Tyler, in the user profile.

At step 1306, control circuitry 504 (FIG. 5) replaces the audio commentary in the first voice with audio commentary in the second voice. For example, control circuitry 504 may retrieve the voice model of Martin Tyler from a voice database, which provides frequency and temporal information associated with objects, people, animals, etc. The voice database may also include clips of various words or sounds from an object, person or animal. Control circuitry 504 may then retrieve, from the media guidance data source 618 (FIG. 6), closed-captioning information associated with the virtual reality media asset. Once control circuitry 504 has textual information about the events in the virtual reality media asset, control circuitry 504 may generate audio of the second voice (e.g., of Martin Tyler) reading the textual information retrieved from closed-captioning.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 13.

Figure 14:
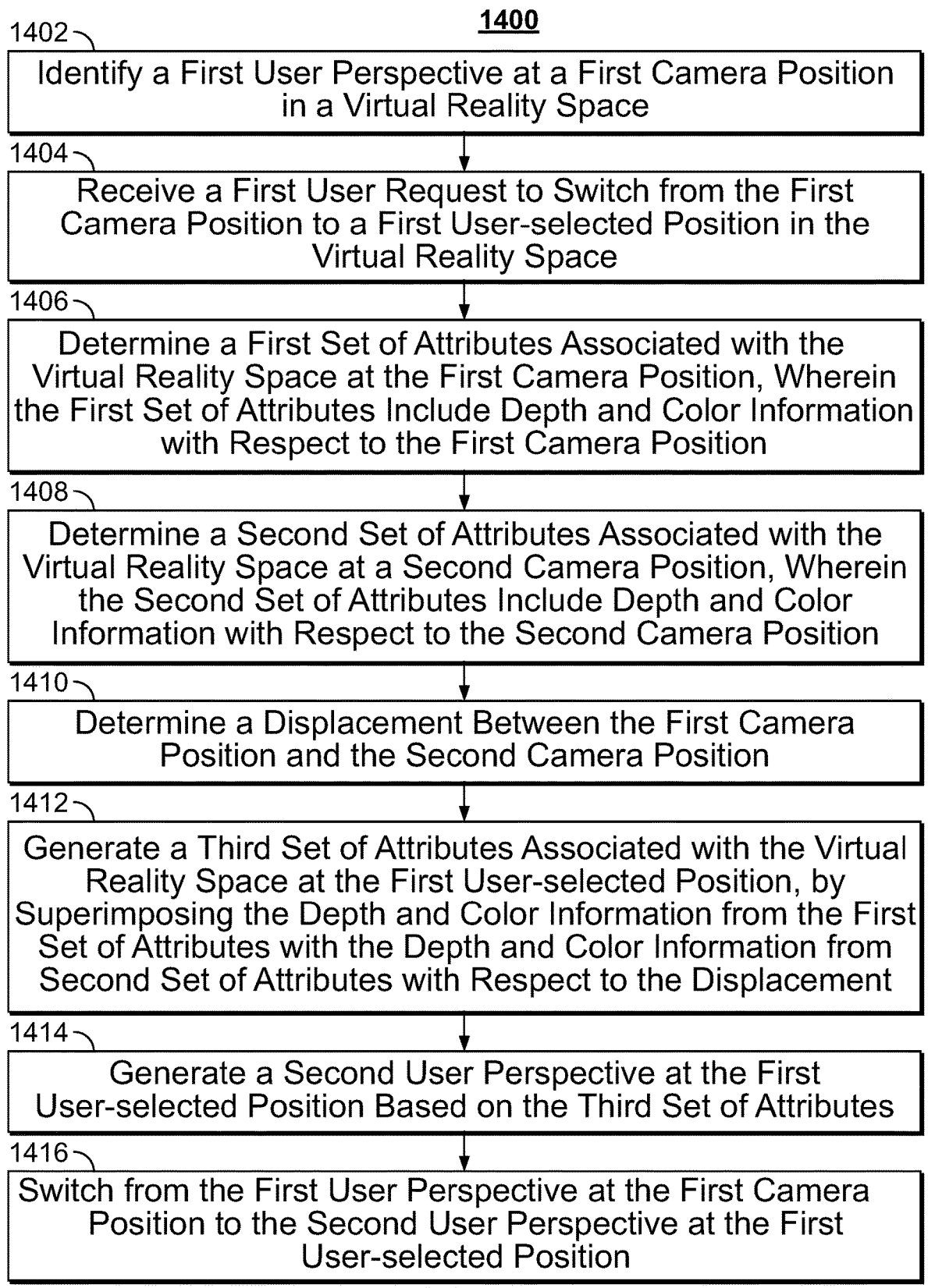
FIG. 14 is a flowchart of a detailed illustrative process for changing a user's perspective in virtual reality, in accordance with some embodiments of the disclosure.

FIG. 14 is a flowchart of a detailed illustrative process for changing a user's perspective in virtual reality, in accordance with some embodiments of the disclosure. It should be noted that process 1400 or any step thereof could be performed on, or provided by, any of the devices shown in FIGS. 5-6. For example, process 1400 may be executed by control circuitry 504 (FIG. 5) as instructed by a media guidance application implemented on a user device (e.g., user equipment devices 602, 604, and/or 606 (FIG. 6)) in order to change a user's perspective in virtual reality. In addition, one or more steps of process 1400 may be incorporated into or combined with one or more steps of any other process or embodiment (e.g., as described in relation to FIGS. 1A, 1B, 2A, 2B, 7-13 and 15-18).

At step 1402, control circuitry 504 (FIG. 5) identifies a first user perspective at a first camera position in a virtual reality space. Suppose that the user is viewing a soccer match through a Google Daydream headset, retrieved by control circuitry 504 from media content source 616 (FIG. 6). In this scenario, the soccer match may be pre-rendered using several virtual reality cameras that can capture 360-degree video. The first camera position represents the location of the first camera in the physical soccer field during recording. Suppose that the first camera is placed along the center of the field at the edge. The first user perspective represents the 360-degree view at the position that the camera captured the 360-degree video. Furthermore, the first camera position represents an origin point of the point cloud of the first camera position. As mentioned previously, a point cloud is a set of coordinates in a three-dimensional coordinate system that represents the external surface of an object.

At step 1404, control circuitry 504 (FIG. 5) receives a first user request to switch from the first camera position to a first user-selected position in the virtual reality space. The user may utilize a cursor that can be moved in the virtual reality space. Once the user has identified a position of interest, the user may select the position. Control circuitry 504 may receive the user's request to switch to the first-user-selected position through I/O Path 502. For example, the user may select the center circle of the soccer field. Accordingly, control circuitry 504 may determine the coordinates of the first user-selected position with respect to the origin point of the first camera position. For example, the origin point of the point cloud of the first camera position may be (0,0,0) (e.g., on a x,y,z coordinate system labelled as (x,y,z)). Coordinates may be labelled in physical dimensions (e.g., meters, feet, inches, etc.) or quantitative values on an arbitrary proportional scale. Therefore, (x,y,z) may also represent (width, length, height). Suppose that control circuitry 504 is using meters for coordinates. The first-user selected position may therefore be (0 meters, 45 meters, 0 meters). This indicates that the first-user selected position is on the same x and z axis, but is 45 meters ahead in the y-axis (e.g., on the center of the field).

At step 1406, control circuitry 504 (FIG. 5) determines a first set of attributes associated with the virtual reality space at the first camera position, wherein the first set of attributes include depth and color information with respect to the first camera position. Control circuitry 504 may retrieve the first set of attributes from the metadata associated with the virtual reality media asset (e.g., retrieved from the media guidance data source 618 (FIG. 6)). As discussed previously, control circuitry 504 may refer to a point cloud to determine physical coordinates of the virtual reality space, along with the objects that inhabit the space. The point cloud may provide depth information, such as coordinates of every point in the point cloud with respect to an origin point. Furthermore, the set of attributes may be organized by the frames of the virtual reality media asset. For example, each frame in the virtual reality media asset may be associated with a unique list of coordinates and color information that make up the point cloud of the set of attributes. Each virtual reality frame may therefore be associated with a time (e.g., relative to the start of the virtual reality media asset), with the time increments being dependent on the frame refresh rate, as well as depth and color information associated with the frame.

At step 1408, control circuitry 504 (FIG. 5) determines a second set of attributes associated with the virtual reality space at a second camera position, wherein the second set of attributes include depth and color information with respect to the second camera position. Virtual reality content is often captured using multiple virtual reality cameras placed in various locations. For example, a soccer game may be captured with several virtual reality cameras so that the viewer can see the players even if they move to the opposite side of the field. In this case, control circuitry 504 may identify a second camera position. Information detailing the number of cameras used to capture the virtual reality media asset being accessed by the user may be retrieved by control circuitry 504 from the media guidance data source 618 (FIG. 6). Control circuitry 504 may refer to the metadata of the virtual reality media asset, which may list the virtual reality camera angles used, and the locations of the virtual reality cameras in the physical environment. For example, the metadata may list that two cameras were used to capture the soccer match. One camera was placed 45 meters to the right of the center of the field, whereas the second camera was placed 45 meters to the left of the center of the field. Upon identifying the second camera position, control circuitry 504 may determine the second set of attributes associated with the virtual reality space at the second camera position. The second set of attributes may be divided in virtual reality frames. For each frame, the time increment, depth information, and color information may be listed.

At step 1410, control circuitry 504 (FIG. 5) determines a displacement between the first camera position and the second camera position. As mentioned previously, control circuitry 504 may retrieve information about the number of cameras and their relative positions in the physical environment (e.g., the actual soccer field) from the metadata of the virtual reality media asset. Using the relative positions of the virtual reality cameras, control circuitry 504 may determine a displacement between the first and second camera position. For example, since one camera is placed 45 meters to the right of the field's center and the second camera is placed 45 meters to the left, control circuitry 504 may determine that the displacement between the two camera positions is 90 meters along the y-axis.

At step 1412, control circuitry 504 (FIG. 5) generates a third set of attributes associated with the virtual reality space at the first user-selected position, by superimposing the depth and color information from the first set of attributes with the depth and color information from second set of attributes with respect to the displacement. For example, control circuitry 504 may first synchronize the frames from the first and second set of attributes. Suppose that the first frame in the first set of attributes occurs exactly one second from the start of the virtual reality media asset playback and the first frame in the second set of attributes occurs exactly two seconds from the start of the virtual reality media asset. Control circuitry 504 may synchronize the frames such that the frames occurring at the same exact time are considered. Upon identifying the frames that are occurring at the same time, control circuitry 504 may superimpose the depth and color information from the second set of attributes, with the first set of attributes. It should be noted that control circuitry 504 may only superimpose to fill missing information about a virtual reality space. For example, the first camera may be able to capture the front-side of a player on the field. However, if the player has his back against the second camera, the second camera will only be able to capture the back-side of the player. Superimposing the depth and color information allows the third set of attributes to include depth and color information that reflects both the front-side and back-side of the player. Furthermore, multiple cameras may be used to further enhance the generation process of the third set of attributes. Multiple cameras can provide different perspectives of the virtual reality space, thus providing more information about it. The third set of attributes may include a point cloud that provides depth and color information with respect to the origin point of the first camera position. As discussed previously, control circuitry 504 also holds the coordinates to the first user-selected position. Accordingly, control circuitry 504 may reconfigure the coordinates in the third set of attributes to refer back to the first user-selected position, rather than the first camera position. For example, if an arbitrary coordinate is (0 meters, 2 meters, and 0 meters) away from the origin point of the first camera position, and the first user-selected camera position is (0 meters, 45 meters, 0 meters) away from the origin point of the first camera position, control circuitry 504 may reconfigure the arbitrary coordinate to read (0 meters, 43 meters, 0 meters). This signifies that the arbitrary coordinate is (0 meters, 43 meters, 0 meters) away from the first user-selected position, the new origin point of the third set of attributes.

At step 1414, control circuitry 504 (FIG. 5) generates a second user perspective at the first user-selected position based on the third set of attributes. For example, using the third set of attributes, control circuitry 504 may generate a 360-degree representation of the point cloud. Control circuitry 504 may employ computer vision processes to merge the set of points into a mesh, thus allowing the second user perspective to look like a video, rather than a collection of points.

At step 1416, control circuitry 504 (FIG. 5) switches from the first user perspective at the first camera position to the second user perspective at the first user-selected position. Similar to switching from one camera position to the second camera position, control circuitry 504 may simply generate, for display, the second user perspective on display 512 of the user's device.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 14.

Figure 15:
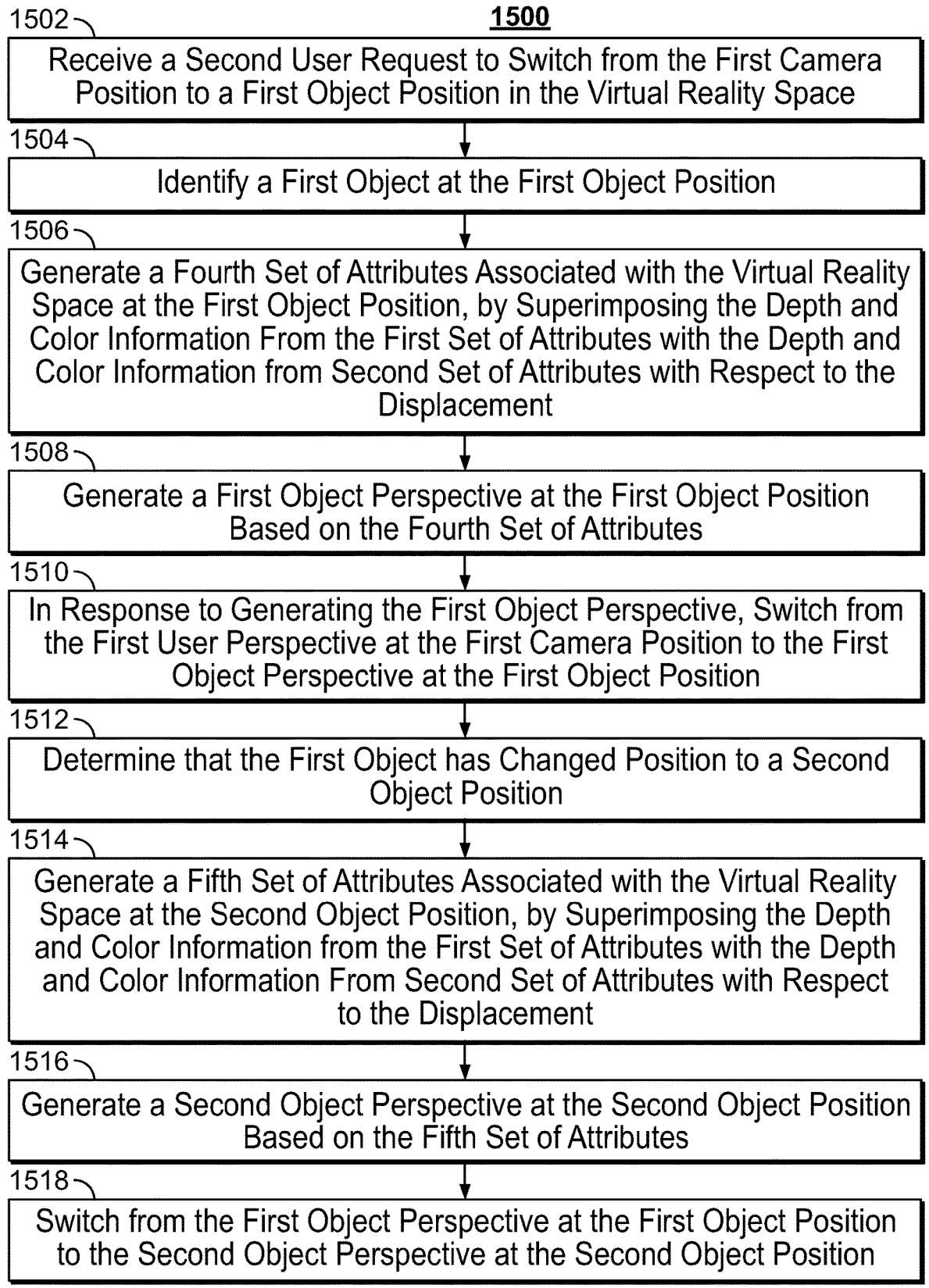
FIG. 15 is a flowchart of a detailed illustrative process for switching from the first object perspective at the first object position to the second object perspective at the second object position, in accordance with some embodiments of the disclosure.

FIG. 15 is a flowchart of a detailed illustrative process for switching from the first object perspective at the first object position to the second object perspective at the second object position, in accordance with some embodiments of the disclosure. It should be noted that process 1500 or any step thereof could be performed on, or provided by, any of the devices shown in FIGS. 5-6. For example, process 1500 may be executed by control circuitry 504 (FIG. 5) as instructed by a media guidance application implemented on a user device (e.g., user equipment devices 602, 604, and/or 606 (FIG. 6)) in order to switch from the first object perspective at the first object position to the second object perspective at the second object position. In addition, one or more steps of process 1500 may be incorporated into or combined with one or more steps of any other process or embodiment (e.g., as described in relation to FIGS. 1A, 1B, 2A, 2B, 7-14 and 16-18).

At step 1502, control circuitry 504 (FIG. 5) receives a second user request to switch from the first camera position to a first object position in the virtual reality space. Control circuitry 504 may receive this request through I/O Path 502. Suppose that the user is viewing a soccer match and desires to view the match from the perspective of the player. The player may be moving from one position to another position over the course of several frames. Due to this, control circuitry 504 may determine, from the user's selected first object position, the object that the user wishes to track. The user may use a cursor to navigate the virtual reality space and select a first object position. In response, control circuitry 504 may retrieve the coordinates of the first object position with respect to the first camera position (e.g., the origin point).

At step 1504, control circuitry 504 (FIG. 5) identifies a first object at the first object position. Suppose that the user chooses to view the soccer match through the perspective of Lionel Messi, an athlete in the soccer match. Control circuitry 504 may use the coordinates of the first object position to determine neighboring points in the point cloud. Control circuitry 504 may further use computer vision processes such as clustering and segmentation to determine the shape that the neighboring points create. Control circuitry 504 may then refer to an object classification database in storage 508, which includes object shapes (e.g., point clouds) and the respective names of the objects. For example, control circuitry 504 may determine the shape of the point cloud at the first object position. Control circuitry 504 may compare the shape with the shapes in the shape classification database, and determine that the first object is a person.

At step 1506, control circuitry 504 (FIG. 5) generates a fourth set of attributes associated with the virtual reality space at the first object position, by superimposing the depth and color information from the first set of attributes with the depth and color information from second set of attributes with respect to the displacement. As discussed previously, control circuitry 504 may first synchronize the frames from the first and second set of attributes. Upon identifying the frames that are occurring at the same time, control circuitry 504 may superimpose the depth and color information from the second set of attributes, with the first set of attributes. It should be noted that control circuitry 504 may only superimpose to fill missing information about a virtual reality space. For example, the first camera may be able to capture the front-side of a player on the field. However, if the player has his back against the second camera, the second camera will only be able to capture the back-side of the player. Accordingly, control circuitry 504 may reconfigure the coordinates in the fourth set of attributes to refer back to the first object position, rather than the first camera position. For example, if an arbitrary coordinate is (0 meters, 2 meters, and 0 meters) away from the origin point of the first camera position, and the first object camera position is (0 meters, 45 meters, 0 meters) away from the origin point of the first camera position, control circuitry 504 may reconfigure the arbitrary coordinate to read (0 meters, 43 meters, 0 meters). This signifies that the arbitrary coordinate is (0 meters, 43 meters, 0 meters) away from the first object position, the new origin point of the fourth set of attributes.

At step 1508, control circuitry 504 (FIG. 5) generates a first object perspective at the first object position based on the fourth set of attributes. As noted previously, the first object perspective changes as the first object moves around in the virtual reality space. For example, Lionel Messi, the first object, may move from one position to another across the various frames in the virtual reality media asset. Once control circuitry 504 has generated the fourth set of attributes, control circuitry 504 may track the movement of the first object and reset the origin point accordingly. Therefore, the first object perspective is regenerated each time the first object changes position in the virtual reality space. Nonetheless, the first object perspective remains a 360-degree view of the virtual reality environment, and is produced by converting the point cloud to a mesh, thus allowing the first object perspective to look like a video, rather than a collection of points.

At step 1510, in response to generating the first object perspective, control circuitry 504 (FIG. 5) switches from the first user perspective at the first camera position to the first object perspective at the first object position. Similar to switching from one camera position to the second camera position, control circuitry 504 may simply generate, for display, the first object perspective on display 512 of the user's device.

At step 1512, control circuitry 504 (FIG. 5) determines that the first object has changed position to a second object position. For example, the first object, Lionel Messi, may run from one location on the soccer field to another location. Control circuitry 504 may detect the movement of the first object by analyzing a translation of the point cloud cluster of the first object over a course of frames. For example, suppose that the first object is defined by a set of points that are clustered together. If the set of points appears in location A in frame 1, but appears in location B in frame 2, control circuitry 504 may determine that the first object has changed position to a second object position.

At step 1514, control circuitry 504 (FIG. 5) generates a fifth set of attributes associated with the virtual reality space at the second object position, by superimposing the depth and color information from the first set of attributes with the depth and color information from second set of attributes with respect to the displacement. For example, control circuitry 504 may first synchronize the frames from the first and second set of attributes. Upon identifying the frames that are occurring at the same time, control circuitry 504 may superimpose the depth and color information from the second set of attributes, with the first set of attributes. In some embodiments, control circuitry 504 may also adjust the fourth set of attributes by re-centering the origin point as the second user position. As a result, the coordinates of the virtual reality space generated with respect to the first object's most-current position.

At step 1516, control circuitry 504 (FIG. 5) generate a second object perspective at the second object position based on the fifth set of attributes. At step 1518, control circuitry 504 (FIG. 5) switches from the first object perspective at the first object position to the second object perspective at the second object position. With these steps, control circuitry 504 is able to track the object selected by the user throughout the virtual reality media asset, and allow the user to view the virtual reality media asset through the perspective of the object.

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 15.

FIG. 16 is a flowchart of a detailed illustrative process for superimposing the depth and color information of the first origin point and the depth and color information of the third origin point, in accordance with some embodiments of the disclosure. It should be noted that process 1600 or any step thereof could be performed on, or provided by, any of the devices shown in FIGS. 5-6. For example, process 1600 may be executed by control circuitry 504 (FIG. 5) as instructed by a media guidance application implemented on a user device (e.g., user equipment devices 602, 604, and/or 606 (FIG. 6)) in order to superimpose the depth and color information of the first origin point and the depth and color information of the third origin point. In addition, one or more steps of process 1600 may be incorporated into or combined with one or more steps of any other process or embodiment (e.g., as described in relation to FIGS. 1A, 1B, 2A, 2B, 7-15 and 17-18).

At step 1602, control circuitry 504 (FIG. 5) begins the process of superimposing the depth and color information from the first set of attributes with the depth and color information from second set of attributes with respect to the displacement. For example, control circuitry 504 may retrieve depth and color information from the metadata of the virtual reality media asset for each camera position. The metadata may be accessed by control circuitry 504 from the media guidance data source 618 (FIG. 6).

At step 1604, control circuitry 504 (FIG. 5) determines a first origin point of the depth and color information of the first set of attributes. For example, control circuitry 504 may determine that the first origin point of the first set of attributes is (0,0,0).

At step 1606, control circuitry 504 (FIG. 5) determines a second origin point of the depth and color information of the second set of attributes. For example, control circuitry 504 may determine that the second origin point of the second set of attributes is also (0,0,0).

At step 1608, control circuitry 504 (FIG. 5) shifts the second origin point by the displacement to a third origin point. As previously mentioned, control circuitry 504 may refer to the metadata of the virtual reality media asset to determine the number of cameras used to capture the virtual reality media asset and the positions of the cameras. In this case two cameras are used. Accordingly, control circuitry 504 may determine that the displacement between the two cameras is 90 meters along the y-axis. More specifically, the second camera is 90 meters ahead of the first camera. In response, control circuitry 504 may shift the second origin point by 90 meters along the y-axis. As a result, all points in the second set of attributes would be shifted by 90 meters as well. The second origin point would be thus identified as a third origin point at (0, 90 meters, 0).

At step 1610, control circuitry 504 (FIG. 5) superimposes the depth and color information of the first origin point and the depth and color information of the third origin point. Once the points have been shifted by 90 degrees, the point cloud of the first set of attributes is placed near the second set of attributes relative to their locations in the physical soccer field. In some embodiments, control circuitry 504 may apply a computer vision process to superimpose the depth and color information of the first origin point and the depth and color information of the third origin point. In some instances, the depth information from the first set of attributes may not perfectly meet the depth information from the second set of attributes. In the example given of the front-side and back-side of a player being superimposed, it is possible that the front-side point cloud has an offset of two centimeters. The small difference may be due to a slight movement of the virtual reality camera that is not recorded in the metadata of the virtual reality media asset. In order to ensure that the points in the point cloud are superimposed correctly, control circuitry 504 may use registration to superimpose the depth and color information.

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 16.

Figure 17:
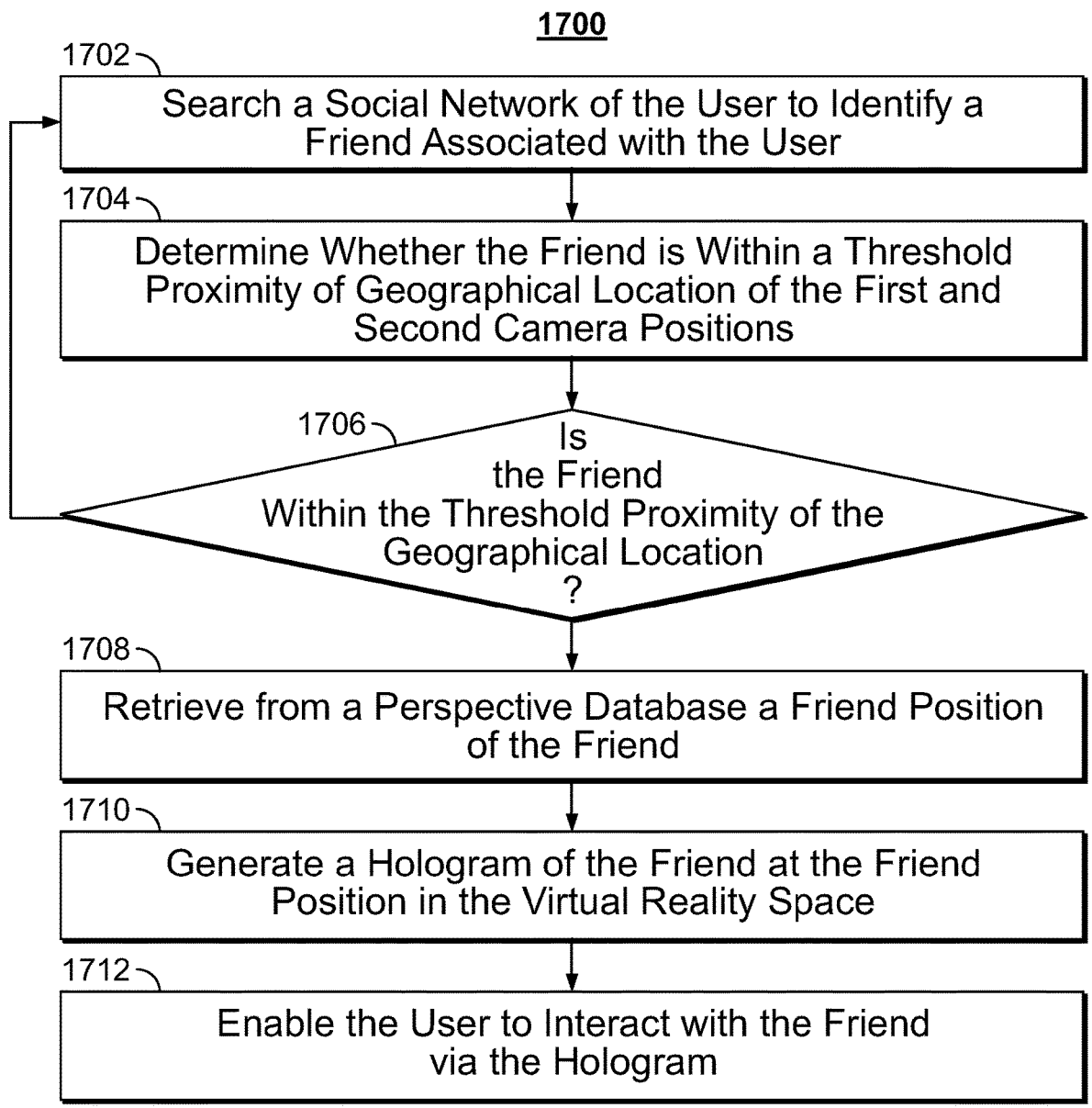
FIG. 17 is a flowchart of a detailed illustrative process for enabling the user to interact with the friend via the hologram, in accordance with some embodiments of the disclosure.

FIG. 17 is a flowchart of a detailed illustrative process for enabling the user to interact with the friend via the hologram, in accordance with some embodiments of the disclosure. It should be noted that process 1700 or any step thereof could be performed on, or provided by, any of the devices shown in FIGS. 5-6. For example, process 1700 may be executed by control circuitry 504 (FIG. 5) as instructed by a media guidance application implemented on a user device (e.g., user equipment devices 602, 604, and/or 606 (FIG. 6)) in order to enable the user to interact with the friend via the hologram. In addition, one or more steps of process 1700 may be incorporated into or combined with one or more steps of any other process or embodiment (e.g., as described in relation to FIGS. 1A, 1B, 2A, 2B, 7-16 and 18).

At step 1702, control circuitry 504 (FIG. 5) searches a social network of the user to identify a friend associated with the user. Control circuitry 504 may identify the plurality of friends using various sources. For example, control circuitry 504 may access the user profile in storage 508 associated with the user. The user profile may include a list of friends the user has. Control circuitry 504 may also access a list of friends from social media accounts of the user on the Internet. If the user is using wireless user communications device 606 (FIG. 6), control circuitry 504 may also identify friends that the user calls or messages via wireless user communications device 606. Suppose that control circuitry 504 identifies friend A and friend B.

At step 1704, control circuitry 504 (FIG. 5) determines whether the friend is within a threshold proximity of a geographical location of the first and second camera positions. For example, friend A may also be viewing the virtual reality media asset of the soccer match. Control circuitry 504 on the user's device may communicate with control circuitry 504 on the friend's device over communication network 614 (FIG. 6) to determine whether the friend is accessing the virtual reality media asset. In response to determining that the friend is accessing the virtual reality media asset, or has previously accessed the virtual reality media asset based on the friend's viewing history, control circuitry 504 on the user's device may determine that friend A has selected a location in the virtual reality space (e.g., a geographical location) that is within a threshold proximity of the first and second camera positions. If the friend previously accessed the virtual reality media asset, control circuitry 504 may retrieve a list of selected locations from a perspective database (e.g., in a remote database) that detail the coordinates of the locations that the friend viewed the virtual reality media asset from, and the times/frames at which the friend switched positions.

At step 1706, control circuitry 504 (FIG. 5) determines whether the friend is/was within the threshold proximity of the geographical location. The threshold proximity may be a boundary or a radius of a specific length (e.g., 45 meters). Suppose that the geographic location of the friend is (0.15 meters, 0) and the boundary is a sphere with a 45-meter radius from the origin point. Control circuitry 504 may determine that the user's geographic location is within the threshold proximity. In response to determining the friend's geographic location is within the threshold proximity, the process advances to step 1708. Otherwise, the process returns to step 1702 and control circuitry 504 searches for other friends who have accessed the virtual reality media asset.

At step 1708, control circuitry 504 (FIG. 5) retrieves from a perspective database, a friend position of the friend. For example, control circuitry 504 may retrieve the coordinates of the friend (e.g., (12 meters, 30 meters, 1 meter) at a specific frame of the virtual reality media asset (e.g., frame 1) from the perspective database. The perspective database may track the selected locations at each frame of a virtual reality media asset. Furthermore, the perspective database may also contain information about the friends that are associated with each user.

At step 1710, control circuitry 504 (FIG. 5) generates a hologram of the friend at the friend position in the virtual reality space. For example, control circuitry 504 may generate a virtual avatar of the friend that resembles the friend. Control circuitry 504 may execute resemblance by referring to images of the friend of the friend's social media. Control circuitry 504 may also refer to a media database of the friend that includes recordings of the friend reacting to various events in the virtual reality media asset. Control circuitry 504 may extract the facial features of the friend using computer vision processes (e.g., image recognition, classification, segmentation) to stitch the face of the friend to the virtual avatar. Suppose that the user is accessing the virtual reality media asset using a hologram projector. In this case, control circuitry 504 may also generate a physical hologram of the friend.

At step 1712, control circuitry 504 (FIG. 5) enables the user to interact with the friend via the hologram. For example, control circuitry 504 may allow the user to speak to the hologram or virtual avatar. On the backend of the media guidance application, control circuitry 504 may send messages to the friend by converting the user's speech to text. If the friend of the user responds, control circuitry 504 may read the message of the friend to the user through the hologram, in the voice of the friend. Furthermore, control circuitry 504 may add reactions made by the friend to the hologram, and utilize natural language processing to simulate emotion based on the friend's likes and dislikes (e.g., determined in accordance with the friend's user profile). Similarly, the user and friend may communicate through audio over communication network 614 (FIG. 6).

It is contemplated that the steps or descriptions of FIG. 17 may be used with any other embodiment of this disclosure. In addition, the steps and descriptions described in relation to FIG. 17 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 17.

Figure 18:
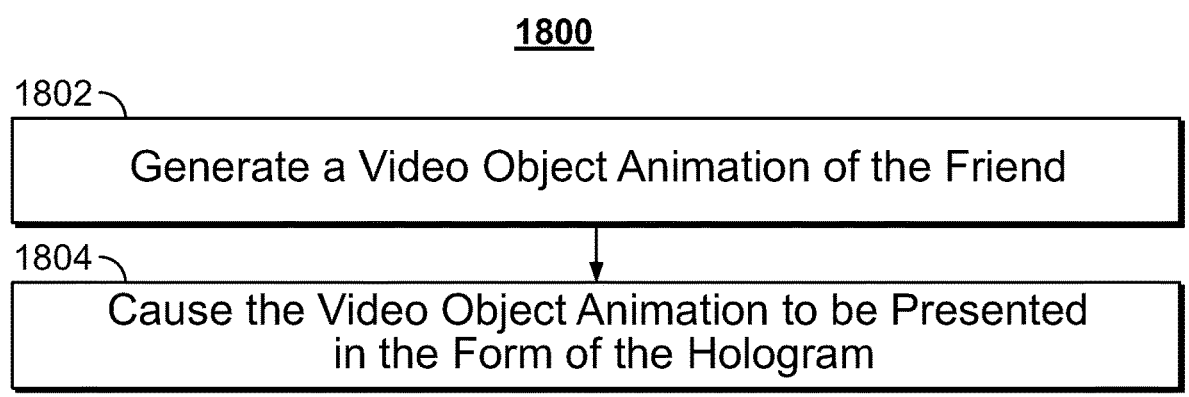
FIG. 18 is a flowchart of a detailed illustrative process for generating a video object animation of a friend of the user, in accordance with some embodiments of the disclosure.

FIG. 18 is a flowchart of a detailed illustrative process for generating a video object animation of a friend of the user, in accordance with some embodiments of the disclosure. It should be noted that process 1800 or any step thereof could be performed on, or provided by, any of the devices shown in FIGS. 5-6. For example, process 1800 may be executed by control circuitry 504 (FIG. 5) as instructed by a media guidance application implemented on a user device (e.g., user equipment devices 602, 604, and/or 606 (FIG. 6)) in order to generate a video object animation of a friend of the user. In addition, one or more steps of process 1800 may be incorporated into or combined with one or more steps of any other process or embodiment (e.g., as described in relation to FIGS. 1A, 1B, 2A, 2B, and 7-17).

At step 1802, control circuitry 504 (FIG. 5) generates a video object animation of the friend. In some embodiments, the video object animation represents a reaction of the friend to an event that takes place at a location associated with the first and second camera positions. For example, the friend may react to an event (e.g., a soccer goal) while viewing the virtual reality media asset at a certain location (e.g., with coordinates (4 meters, 5 meters, 6 meters)). Control circuitry 504 of a camera may be used to capture the reaction of the user. The reaction may be stored in the media database and labelled with the coordinates of the location of the user along with the time/frame information of the virtual reality media asset. Accordingly, control circuitry 504 may generate a video object animation, such as a virtual reality avatar, that animates the reaction of the friend. Animating the reaction of the friend may involve creating a cartoon version of the friend that mimics the friend's facial features by using computer vision to simulate motion capture. Animating the reaction may also include extracting the face of the friend from the video of a reaction from the media database discussed previously, and stitching it to the virtual reality avatar.

At step 1804, control circuitry 504 (FIG. 5) causes the video object animation to be presented in the form of the hologram. For example, control circuitry 504 may generate a three-dimensional virtual avatar and project the dimensions of the virtual avatar using a hologram projector.

It is contemplated that the steps or descriptions of FIG. 18 may be used with any other embodiment of this disclosure. In addition, the steps and descriptions described in relation to FIG. 18 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 18.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for changing a user's perspective in virtual reality, the method comprising:
   identifying a first user perspective at a first camera position in a virtual reality space;
   receiving a first user request to switch from the first camera position to a first user-selected position in the virtual reality space;
   determining a first set of attributes associated with the virtual reality space at the first camera position, wherein the first set of attributes include depth and color information with respect to the first camera position;
   determining a second set of attributes associated with the virtual reality space at a second camera position, wherein the second set of attributes include depth and color information with respect to the second camera position;
   determining a displacement between the first camera position and the second camera position;
   generating a third set of attributes associated with the virtual reality space at the first user-selected position, by superimposing the depth and color information from the first set of attributes with the depth and color information from second set of attributes with respect to the displacement;
   generating a second user perspective at the first user-selected position based on the third set of attributes;
   in response to generating the second user perspective, switching from the first user perspective at the first camera position to the second user perspective at the first user-selected position
   searching a social network of the user to identify a friend associated with the user;
   determining whether the friend is within a threshold proximity of a geographical location of the first and second camera positions;
   in response to determining the friend is within the threshold proximity of the geographical location, retrieving from a perspective database a friend position of the friend; and
   generating a hologram of the friend at the friend position in the virtual reality space.

2. The method of claim 1, the method comprising:
   receiving a second user request to switch from the first camera position to a first object position in the virtual reality space;
   identifying a first object at the first object position;
   generating a fourth set of attributes associated with the virtual reality space at the first object position, by superimposing the depth and color information from the first set of attributes with the depth and color information from second set of attributes with respect to the displacement;
   generating a first object perspective at the first object position based on the fourth set of attributes; and
   in response to generating the first object perspective, switching from the first user perspective at the first camera position to the first object perspective at the first object position.

3. The method of claim 2, wherein switching from the first user perspective at the first camera position to the object perspective at the first object position further comprises:
   determining that the first object has changed position to a second object position;
   generating a fifth set of attributes associated with the virtual reality space at the second object position, by superimposing the depth and color information from the first set of attributes with the depth and color information from second set of attributes with respect to the displacement;
   generating a second object perspective at the second object position based on the fifth set of attributes; and
   in response to generating the second object perspective, switching from the first object perspective at the first object position to the second object perspective at the second object position.

4. The method of claim 1, wherein superimposing the depth and color information from the first set of attributes with the depth and color information from second set of attributes with respect to the displacement, further comprises:
   determining a first origin point of the depth and color information of the first set of attributes;
   determining a second origin point of the depth and color information of the second set of attributes;
   shifting the second origin point by the displacement to a third origin point; and
   superimposing the depth and color information of the first origin point and the depth and color information of the third origin point.

5. The method of claim 4, further comprising applying a computer vision process to superimpose the depth and color information of the first origin point and the depth and color information of the third origin point.

6. The method of claim 1, further comprising:
   accessing a media asset representing an event associated with the geographical location in the virtual reality space;
   determining the friend position at a play position of the media asset; and
   causing the hologram to be presented when the media asset reaches the play position.

7. The method of claim 1, further comprising enabling the user to interact with the friend via the hologram.

8. The method of claim 1, further comprising:
   generating a video object animation of the friend; and
   causing the video object animation to be presented in the form of the hologram.

9. The method of claim 8, wherein the video object animation represents a reaction of the friend to an event that takes place at a location associated with the first and second camera positions.

10. A system for changing a user's perspective in virtual reality, the system comprising:
control circuitry configured to:
identify a first user perspective at a first camera position in a virtual reality space;
receive a first user request to switch from the first camera position to a first user-selected position in the virtual reality space;
determine a first set of attributes associated with the virtual reality space at the first camera position, wherein the first set of attributes include depth and color information with respect to the first camera position;
determine a second set of attributes associated with the virtual reality space at a second camera position, wherein the second set of attributes include depth and color information with respect to the second camera position;
determine a displacement between the first camera position and the second camera position;
generate a third set of attributes associated with the virtual reality space at the first user-selected position, by superimposing the depth and color information from the first set of attributes with the depth and color information from second set of attributes with respect to the displacement;
generate a second user perspective at the first user-selected position based on the third set of attributes;
in response to generating the second user perspective, switch from the first user perspective at the first camera position to the second user perspective at the first user-selected position
search a social network of the user to identify a friend associated with the user;
determine whether the friend is within a threshold proximity of a geographical location of the first and second camera positions;
in response to determining the friend is within the threshold proximity of the geographical location, retrieve from a perspective database a friend position of the friend; and
generate a hologram of the friend at the friend position in the virtual reality space.

11. The system of claim 10, wherein the control circuitry is further configured to:
receive a second user request to switch from the first camera position to a first object position in the virtual reality space;
identify a first object at the first object position;
generate a fourth set of attributes associated with the virtual reality space at the first object position, by superimposing the depth and color information from the first set of attributes with the depth and color information from second set of attributes with respect to the displacement;
generate a first object perspective at the first object position based on the fourth set of attributes; and
in response to generating the first object perspective, switch from the first user perspective at the first camera position to the first object perspective at the first object position.

12. The system of claim 11, wherein the control circuitry is configured to switch from the first user perspective at the first camera position to the object perspective at the first object position by:
determining that the first object has changed position to a second object position;
generating a fifth set of attributes associated with the virtual reality space at the second object position, by superimposing the depth and color information from the first set of attributes with the depth and color information from second set of attributes with respect to the displacement;
generating a second object perspective at the second object position based on the fifth set of attributes; and
in response to generating the second object perspective, switching from the first object perspective at the first object position to the second object perspective at the second object position.

13. The system of claim 10, wherein the control circuitry is configured to superimpose the depth and color information from the first set of attributes with the depth and color information from second set of attributes with respect to the displacement, by:
determining a first origin point of the depth and color information of the first set of attributes;
determining a second origin point of the depth and color information of the second set of attributes;
shifting the second origin point by the displacement to a third origin point; and
superimposing the depth and color information of the first origin point and the depth and color information of the third origin point.

14. The system of claim 13, wherein the control circuitry is further configured to apply a computer vision process to superimpose the depth and color information of the first origin point and the depth and color information of the third origin point.

15. The system of claim 10, wherein the control circuitry is further configured to:
access a media asset representing an event associated with the geographical location in the virtual reality space;
determine the friend position at a play position of the media asset; and
cause the hologram to be presented when the media asset reaches the play position.

16. The system of claim 10, wherein the control circuitry is further configured to enable the user to interact with the friend via the hologram.

17. The system of claim 10, wherein the control circuitry is further configured to:
generate a video object animation of the friend; and
cause the video object animation to be presented in the form of the hologram.

18. The system of claim 17, wherein the video object animation represents a reaction of the friend to an event that takes place at a location associated with the first and second camera positions.

* * * * *